(12) United States Patent
Herring

(10) Patent No.: US 12,181,575 B2
(45) Date of Patent: Dec. 31, 2024

(54) SONAR AQUATIC IMAGER FOR MEASURING AQUATIC DISTURBANCES

(71) Applicant: Rodney Herring, Victoria (CA)

(72) Inventor: Rodney Herring, Victoria (CA)

(*) Notice: Subject to any disclaimer, the term of this patent is extended or adjusted under 35 U.S.C. 154(b) by 232 days.

(21) Appl. No.: 17/780,746

(22) PCT Filed: Nov. 25, 2020

(86) PCT No.: PCT/CA2020/051610
§ 371 (c)(1),
(2) Date: May 27, 2022

(87) PCT Pub. No.: WO2021/102570
PCT Pub. Date: Jun. 3, 2021

(65) Prior Publication Data
US 2022/0413133 A1    Dec. 29, 2022

(30) Foreign Application Priority Data
Nov. 27, 2019  (CA) .................................... 3063460

(51) Int. Cl.
*G01S 15/89*        (2006.01)
*G01S 7/521*        (2006.01)

(52) U.S. Cl.
CPC .............. *G01S 15/89* (2013.01); *G01S 7/521* (2013.01)

(58) Field of Classification Search
CPC ....... G01S 15/89; G01S 7/521; G06V 20/182; G06V 20/41; G08G 1/052; G08G 1/04; G08G 1/015; G08G 1/097; H04N 23/90
See application file for complete search history.

(56) References Cited

U.S. PATENT DOCUMENTS

2008/0091353 A1*  4/2008  Krumhansl ............ G01V 1/003
                                                    702/14
2011/0202278 A1*  8/2011  Caute ...................... G01S 7/521
                                                    702/14
(Continued)

FOREIGN PATENT DOCUMENTS

EP        1110101 A2   6/2001
WO     00/20893 A2     4/2000

OTHER PUBLICATIONS

WIPO, Canadian International Searching Authority, International Search Report mailed Feb. 1, 2021, International Patent Application No. PCT/CA2020051610, 3 Pages.

(Continued)

*Primary Examiner* — Daniel L Murphy
*Assistant Examiner* — Amie M Ndure
(74) *Attorney, Agent, or Firm* — Baumgartner Patent Law, LLC; Marc Baumgartner

(57) ABSTRACT

A sonar aquatic imaging system is provided for obtaining information on aquatic disturbances by imaging the thermal interface in large bodies of water. The imaging system comprises an imager, the imager comprising: a sonar wave emitter configured to emit a sonar wave signal; a reflected wave detector configured to receive a reflected wave signal; a vector network analyzer which includes a Global Navigation Satellite System and an at least one timer, the vector network analyzer in electrical communication with the sonar wave emitter via a first wire and the reflected wave detector via a second wire; and a sonar software programme in electronic communication with the vector network analyzer. The imaging system is provided as part of an aquatic installation.

14 Claims, 19 Drawing Sheets

(56) References Cited

U.S. PATENT DOCUMENTS

| | | | |
|---|---|---|---|
| 2017/0184719 A1* | 6/2017 | Stokes | G01S 7/526 |
| 2017/0192124 A1* | 7/2017 | Kolar | G01V 9/005 |
| 2017/0315225 A1* | 11/2017 | Lee | G01S 13/585 |
| 2017/0343695 A1* | 11/2017 | Stetson | G01V 3/101 |
| 2017/0350978 A1* | 12/2017 | Williamson | G01V 1/3843 |
| 2018/0038977 A1 | 2/2018 | Caute | |
| 2018/0321033 A1* | 11/2018 | Tauriac | B63B 22/18 |
| 2019/0033266 A1* | 1/2019 | Sumption | G01N 29/225 |

OTHER PUBLICATIONS

WIPO, Canadian International Searching Authority, Written Opinion of the International Searching Authority mailed Feb. 1, 2021, International Patent Application No. PCT/CA2020051610, 4 Pages.

* cited by examiner

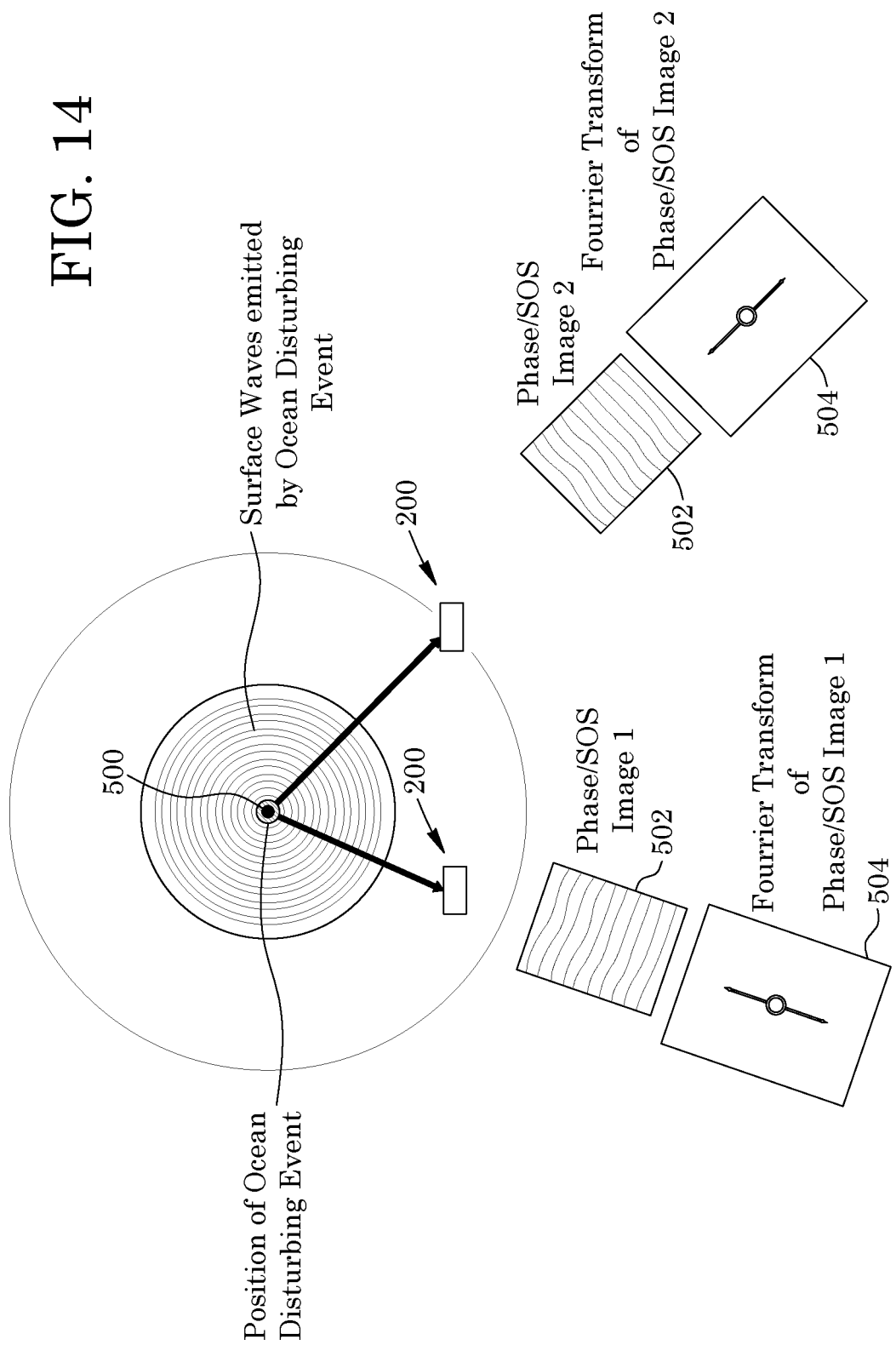

SONAR AQUATIC IMAGER FOR MEASURING AQUATIC DISTURBANCES

CROSS REFERENCE TO RELATED APPLICATIONS

The present invention is filed under 35 U.S.C. § 371 as the U.S. national phase of International Application No. PCT/CA2020/051610, filed Nov. 25, 2020, which designated the U.S. and claims the right of priority of Canadian Patent Application No. 3,063,460, filed with the Canadian Patent Office on Nov. 27, 2019. The entire disclosures of the above-identified priority applications are hereby fully incorporated herein by reference.

FIELD

The present technology and its associated imaging method measure the properties of the aquatic disturbances such as their power, energy, direction of movement, and location from waves existing on the surface of bodies of water and more preferably on the thermocline or metalimnocline. The present technology also measures aquatic temperatures, pressures and compositions by measuring the refractive index (speed of sound) from the time and phase measurements of the sonar wave passing from the sonar emitter to the detector.

BACKGROUND

Sonar is used extensively in the aquatic environment in a broad range of applications including mapping sea and lake beds, detecting marine mammals, detecting fish and detecting submarines. Underwater acoustics are known to be affected by stratification, as the velocity of sound or speed of sound changes with temperature, as well as salinity and hydrostatic pressure, hence a thermocline or metalimnocline will alter sonar waves. United States Patent Application 20170184719 teaches that sonar waves may be reflected off a thermocline and therefore the seabed may be misconstrued as the thermocline. United States Patent Application 20170350978 teaches that sonar waves are distorted by a thermocline.

United States Patent Application 20170192124 discloses a system for mapping a thermocline in a body of fluid includes a thermocline detection and monitoring module, a persistent data storage module; and a plurality of distributed sensors, including intelligent sensors, connected with the at least one thermocline detection and monitoring module and the persistent data storage module by one or more control-level programming and communication methods. The thermocline detection and monitoring module can monitor the thermocline at sampling intervals to collect and fuse measurement data from the plurality of sensors to capture thermocline changes as events, correlate measurement data and events, store measurement data in the persistent data storage module along with previously acquired measurement data for comparison and tracking, characterize the thermocline as a function of spatial location, depth, and time, create and maintain reports that describe the thermocline characteristics, status, trends, and provide multimodal notifications of events to different users. This system does not identify and characterize aquatic disturbances using sonar.

United States Patent Application 20190033266 discloses a monitoring apparatus includes a probe comprising a sensor to detect a condition within a water body, the sensor produces sensor data indicative of the condition within the water body. The probe includes a sound generator to propagates sound waves within the water body that communicate the sensor data from the probe, in various aspects. The monitoring apparatus includes an interface that is submersible within the water body, and the interface receives the sound waves from the sound generator, in various aspects. In various aspects, the interface is mechanically connected with the submersible probe when deployed for traversal of the interface together with the submersible probe about the water body. The mechanical connection between the probe and the interface may orient the probe with respect to the interface to direct the sound waves from the probe to the interface. The probe may identify a thermocline, however it does not use sonar to identify and characterize aquatic disturbances.

Examples of equipment and methods for measuring wave action include United States Patent Application 20180321033 which discloses devices, systems and methods for real-time wave monitoring. One example method for real-time monitoring of wave conditions includes receiving, from a buoy over a first wireless communication channel, information based on continuously monitoring one or more characteristics of the wave conditions, receiving, from a user device over a second wireless communication channel, user preferences, and transmitting, to the user device over the second wireless communication channel, a message based on the information and the user preferences in response to a user request. Another example method includes transmitting, to a remote server, user preferences and a user request, and receiving, from the remote server and in response to the user request, a message based on the user preferences and information corresponding to the wave conditions. In these methods, the time duration between communication of the user request and the information acquisition may be less than a predetermined value. This system relies on a buoy which moves in response to wave action and then, through sensors that sense the movement, a report of the wave characteristics is provided. This system does not use sonar to identify and characterize aquatic disturbances.

United States Patent Application 20170315225 discloses an apparatus and method for extracting ocean wave information. The apparatus for extracting ocean wave information includes a radar image reception unit for receiving a radar image of a buoy from a radar antenna, a digital conversion unit for converting the received radar image into a digital format, an analysis preparation unit for setting analysis sections of the radar image and performing temporal accumulation on the analysis sections, a three-dimensional (3D) spectrum-conversion unit for converting accumulated analysis sections into a 3D spectrum in a 3D frequency domain by performing a temporal/spatial 3D Fast Fourier Transform (FFT) on the accumulated analysis sections, and an ocean wave information extraction unit for extracting ocean wave information based on the 3D spectrum.

United States Patent Application 20180038977 discloses a software defined platform for subsea acoustic applications that utilizes a broadband phased array transducer and a configurable, multi-function software defined transducer that is configurable on the fly to enable various subsea acoustic systems to be achieved in a single unit thus reducing the space required on the vessel and the cost of having such multiple functions. This platform can be used to measure ocean depth, to map the sea floor and to measure currents. It is not configured to identify and characterize aquatic disturbances.

What is needed is a system that identifies aquatic disturbances using sonar. It would be preferable if it provided information on the power and energy of a disturbance, location of a disturbance, and direction of waves emanating from the disturbance. It would be further preferably if it relied on one of more of a software-based method and a hardware-based method of data processing. It would be preferably it if was provided as one or more installations that can communicate from the study sites back to a base.

SUMMARY

The present technology is a system that identifies and characterizes aquatic disturbances using sonar. It provides information on the power and energy of a disturbance, location of a disturbance, and direction of waves emanating from the disturbance. It includes both software and hardware for data processing. It is provided as one or more installations that can communicate from the study sites back to a base.

In one embodiment, a sonar aquatic (SA) imaging installation is provided for detecting disturbances in a thermal interface of an aquatic body, the SA imaging installation comprising: a platform which includes a cross member, at least one telescoping arm extending orthogonally from the cross member and attached directly or indirectly to the cross member at a telescoping arm proximal end, a buoy attached to a distal end of the telescoping arm, a first pillar and a second pillar, the pillars spaced apart a distance, attached directly or indirectly to the cross member and extending orthogonally from the cross member; a sonar wave emitter which is mounted on the first pillar and is configured to emit a sonar wave signal; a reflected wave detector, which is mounted on the second pillar and includes either a one dimensional array of pressure transducers or a two dimensional array of pressure transducers, the reflected wave detector configured to receive a reflected wave signal; a vector network analyzer, the vector network analyzer including a Global Navigation Satellite System (GNSS) and an at least one timer, the vector network analyzer in electrical communication with the sonar wave emitter via a first wire and the reflected wave detector via a second wire; and a computer which includes a sonar software programme, which is in electronic communication with the vector network analyzer.

In the installation, the buoy may be a communication buoy which is in electrical communication with the computer.

The installation may further comprise at least a first and a second thermal sensor mounted on the platform and in electronic communication with the computer, the first thermal sensor vertically disposed from the sonar wave emitter a first height and the second thermal sensor vertically disposed from the first thermal sensor a second height.

In the installation, the first thermal sensor may be vertically disposed from the reflected wave detector the first height.

In the installation, the distance between the sonar wave emitter and the reflected wave detector may be defined by (sine of 15° to 17°)/(first height+0.5 second height=(sine of 75° to 73°)/(0.5 distance).

In the installation, the distance between the sonar wave emitter and the reflected wave detector may be about 3 meters.

In the installation, the sonar wave emitter and the reflected wave detector may be disposed below the thermal sensors.

In the installation, the cross member may be a base which is disposed below the sonar wave emitter and the reflected wave detector.

In the installation, the cross member may be a header which is disposed above the thermal sensors.

In the installation, the vector network analyzer may include a quadrature processor.

In the installation, there may be one telescoping arm and buoy.

In another embodiment, a sonar aquatic (SA) imaging system is provided, for use with a communications buoy and a computing device, the SA imaging system comprising an at least one imager, the imager comprising: a sonar wave emitter configured to emit a sonar wave signal; a reflected wave detector, the reflected wave detector including either a one dimensional array of pressure transducers or a two dimensional array of pressure transducers, the reflected wave detector configured to receive a reflected wave signal; a vector network analyzer, the vector network analyzer including a Global Navigation Satellite System (GNSS) and an at least one timer, the vector network analyzer in electrical communication with the sonar wave emitter via a first wire and the reflected wave detector via a second wire; and a sonar software programme in electronic communication with the vector network analyzer.

In the system, the imager may include a low pass filter.

The system may further comprise the computing device, the computing device in electronic communication with the vector network analyzer.

In the system, the computing device may include a memory and a processor, the memory including instructions for calculating a phase shift.

In the system, the memory may further include instructions for calculating a refractive index based on the phase shift.

In the system, the sonar wave emitter may be configured to emit a water wave and the reflected wave detector may be configured to detect the water wave.

In the system, the vector network analyzer may include a quadrature processor.

In the system, there may be at least two imagers.

In another embodiment, a method of detecting a thermal interface disturbing event in a thermal interface of a body of water is provided, the method comprising utilizing at least one SA imaging installation, the SA imaging installation comprising: a platform which includes a cross member, at least one telescoping arm extending orthogonally from the cross member and attached directly or indirectly to the cross member at a telescoping arm proximal end, a buoy attached to a distal end of the telescoping arm, a first pillar and a second pillar, the pillars spaced apart a distance, attached directly or indirectly to the cross member and extending orthogonally from the cross member; a sonar wave emitter which is mounted on the first pillar and is configured to emit a sonar wave signal; a reflected wave detector, which is mounted on the second pillar and includes either a one dimensional array of pressure transducers or a two dimensional array of pressure transducers, the reflected wave detector configured to receive a reflected wave signal; at least a first and a second thermal sensor mounted on the platform, the first thermal sensor vertically disposed from the sonar wave emitter a first height and the second thermal sensor vertically disposed from the first thermal sensor a second height; a vector network analyzer, the vector network analyzer including a Global Navigation Satellite System (GNSS) and an at least one timer, the vector network analyzer in electrical communication with the sonar wave emitter via a first wire and the reflected wave detector via a second wire; and a computer which includes a sonar software programme, which is in electronic communication with the first and second thermal sensors and the vector network analyzer, the method comprising locating the platform such that the first thermal sensor is above the thermal interface and the second thermal sensor is below the thermal interface, emitting a sonar wave from the sonar wave emitter to the thermal interface, detecting a reflected wave reflected from the thermal interface with the one or two dimensional array of pressure sensors housed in the reflected wave detector, and determining a phase shift between the emitted sonar wave and the reflected wave with the vector network analyzer.

In the method, the sonar wave may be emitted from the sonar emitter to an underside of the thermal interface.

The method may further comprise the sonar wave emitter emitting a water wave concomitantly with the emitting of the sonar wave.

The method may further comprise locating the thermal interface disturbing event using triangulation between at least two SA imaging installations.

The method may further comprise calculating a refractive index based on the phase shift.

The method may further comprise analyzing the phase shift to quantify the thermal interface disturbing event.

In yet another embodiment, a method of detecting an aquatic interface disturbing event in an aquatic interface of a body of water is provided, the method comprising utilizing at least one SA imaging installation, the SA imaging installation comprising: a platform which includes a cross member, at least one telescoping arm extending orthogonally from the cross member and attached directly or indirectly to the cross member at a proximal end, a buoy attached to a distal end of the telescoping arm, a first pillar and a second pillar, the pillars spaced apart a distance, attached directly or indirectly to the cross member and extending orthogonally from the cross member; a sonar wave emitter which is mounted on the first pillar and is configured to emit a sonar wave signal; a reflected wave detector, which is mounted on the second pillar and includes either a one dimensional array of pressure transducers or a two dimensional array of pressure transducers, the reflected wave detector configured to receive a reflected wave signal; a vector network analyzer, the vector network analyzer including a Global Navigation Satellite System (GNSS) and an at least one timer, the vector network analyzer in electrical communication with the sonar wave emitter via a first wire and the reflected wave detector via a second wire; and a computer which includes a sonar software programme, which is in electronic communication with the vector network analyzer, the method comprising emitting a sonar wave from the sonar wave emitter to the aquatic interface, detecting a reflected wave reflected from the aquatic interface with the one or two dimensional array of pressure sensors housed in the reflected wave detector, and determining a phase shift between the emitted sonar wave and the reflected wave with the vector network analyzer.

The method may further comprise the sonar wave emitter emitting a water wave concomitantly with the emitting of the sonar wave.

The method may further comprise locating the aquatic interface disturbing event using triangulation between at least two SA imaging installations.

The method may further comprise calculating a refractive index based on the phase shift.

The method may further comprise analyzing the phase shift to quantify the aquatic interface disturbing event.

In the method, the aquatic interface may be a thermal interface.

In the method, the sonar wave may be emitted from the sonar emitter to an underside of the thermal interface.

FIGURES

FIG. 1 is a schematic of one embodiment of a software-defined sonar aquatic (SDSA) imager of the present technology.

FIG. 2A-C are schematics of the retention system for the SDSA imager of FIG. 1. FIG. 2A is a plan view of the SDSA imager and retention system; FIG. 2B is a longitudinal sectional view showing the wiring routing in the retention system; and FIG. 2C is a longitudinal sectional view showing an alternative wiring routing in the retention system.

FIG. 14 shows two wave vectors produced by two SDSA Ocean Imagers used to determine the location of an aquatic body disturbing event by triangulation and a simulation of the phase image produced by the SDSA imager.

DESCRIPTION

Figure 1:
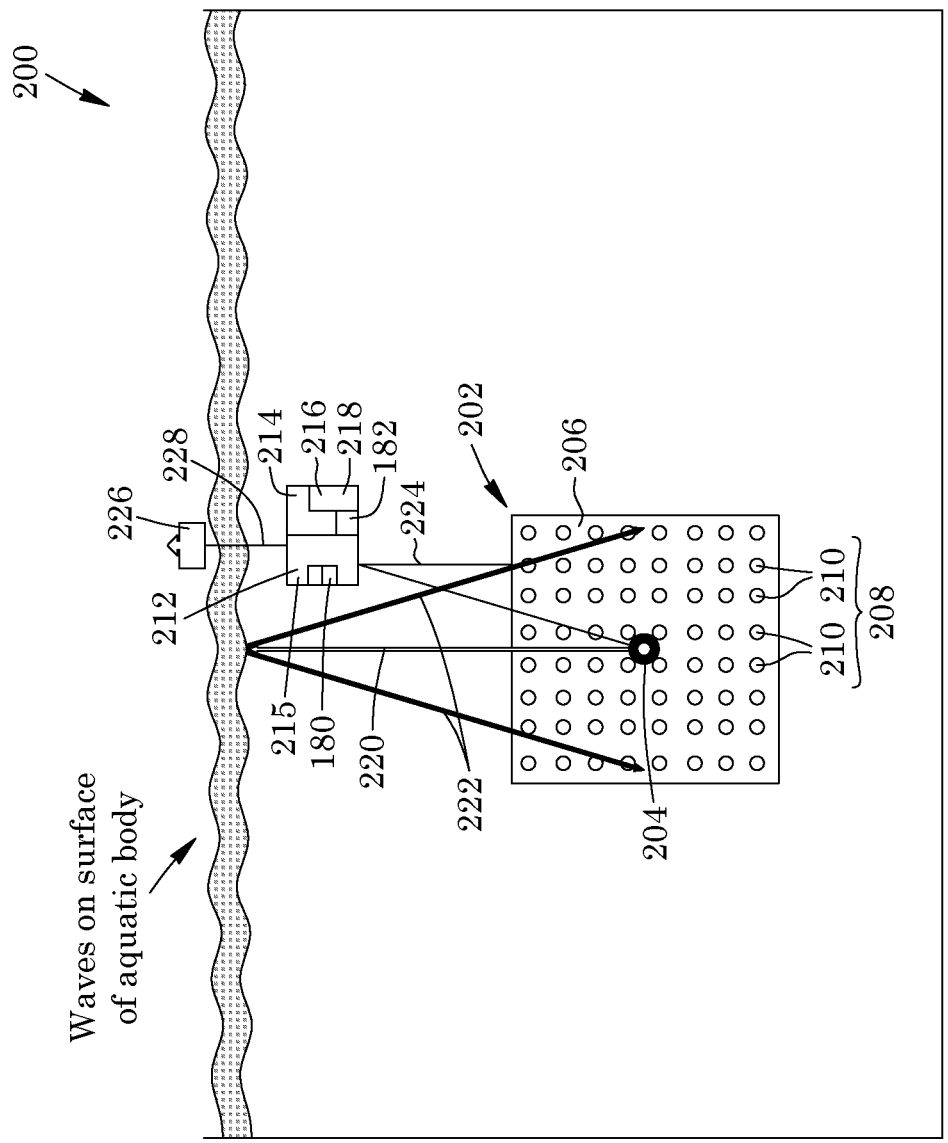

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

DEFINITIONS

Aquatic interface—in the context of the present technology, an aquatic interface includes a thermocline, a metalimnocline and the surface of a large body of water.

Thermal interface—in the context of the present technology, a thermal interface includes a thermocline and a metalimnocline.

Thermal sensor—in the context of the present technology, a thermal sensor is any sensor that reports temperature.

Aquatic disturbance—in the context of the present technology, an aquatic disturbance is anything that causes waves to form in either the aquatic interface or the thermal interface. Aquatic disturbances are caused by, for example, but not limited to wind, earthquakes, gravity waves, tsunami, biological pumps such as whales, large fish, schools of fish, porpoise pods and pressure changes.

DETAILED DESCRIPTION

As shown in FIG. 1, a software defined sonar aquatic (SDSA) imager, generally referred to as 200, is used to image waves existing on the surface of a large body of water or at the thermal interface (thermocline in ocean, metalimnion in lakes) existing between the warm (variable temperature) upper layer of water and the cold (around 4 Celsius) lower layer of water in the ocean or any large body of water.

The SDSA imager 200 includes an integrated unit, generally referred to as 202, which includes a sonar wave emitter 204 and a reflected wave detector 206, which is a one or two-dimensional array detector 206 with a one or two-dimensional array 208 of pressure transducers 210 for creating a phase image. A vector network analyzer 212 is controlled by a computer 214. The vector network analyzer 212 includes a quadrature processor 215 and at least one timer 180. The computer 214 includes a memory 216 which includes a sonar software program 218. Either the computer 214 or the vector network analyze include a Global Navigation Satellite System (GNSS) 182.

The sonar software program 218 obtains data from the vector network analyzer 212 and controls its acquisition and data manipulation. The vector network analyzer 212 is preferably multiplexed with the reflected wave detector 206 as every pressure transducer 210 of the reflected wave detector 206 needs to have a phase and amplitude measurement performed by the vector network analyzer 212. This can be done quickly serially but is best done by multiplexing. Both the sonar wave emitter 204 and the reflected wave detector 206 are in electronic or electrical communication via electrical cables 224 with the computer 214. A power and communication buoy 226 is tethered to the computer 214 with a tether 228, which includes or carries the electrical cables 224.

The angle of reflection or angle the sonar wave emitter 204 directs the sonar wave 220 onto the surface of the water is typically a high angle up to 90 degrees for direct reflection from the water/air interface back to the reflected wave detector 206 of the integrated unit 202. The reflection of sonar waves 220 obeys Snell's law in that the angle of incidence of the sonar wave 220 onto the surface of the water or the thermocline interface is equal to the angle of reflectance of the reflected wave 222 off the thermocline interface. However, as the surface of the water or the thermocline interface is usually not flat and instead, is wavy, the reflected waves 222 will generally return in a fan shape as shown in FIG. 1. Accordingly, the integrated unit 202 is sized to ensure that the reflected waves 222 intercept the detector 206. This can be calculated based upon the depth of the integrated unit 202 in the water relative to the surface of the aquatic body or the thermocline.

Figure 2B:
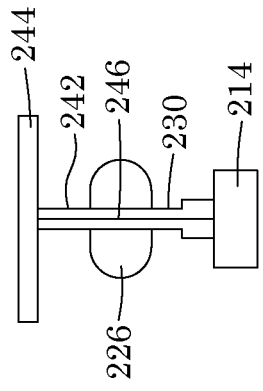
Figure 2C:
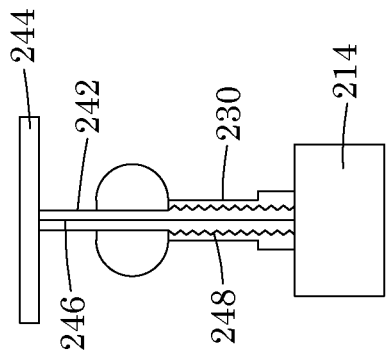
Figure 2A:
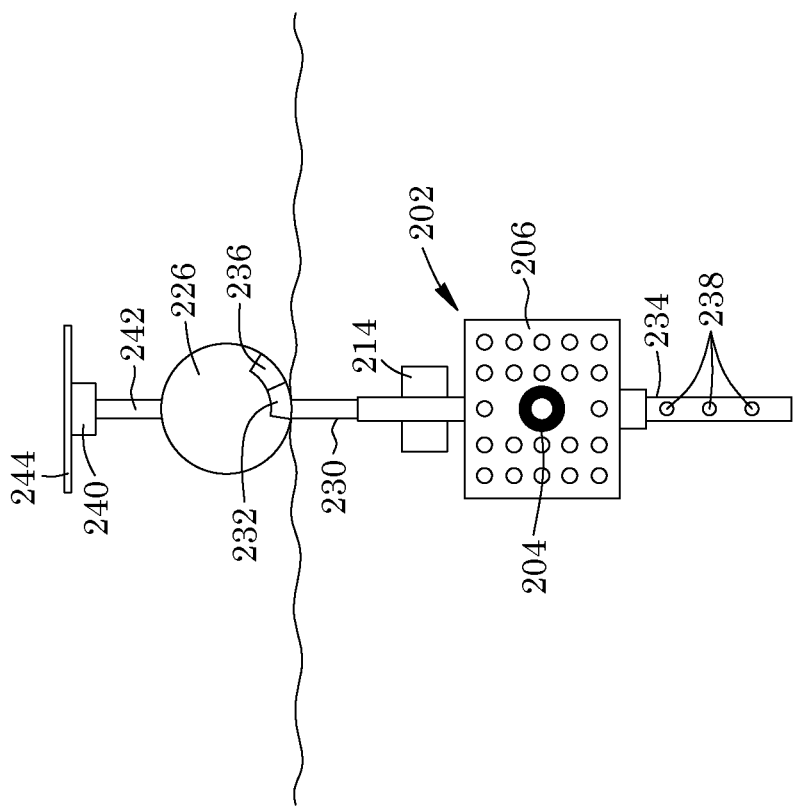

As shown in FIG. 2A, in one embodiment, the depth of the integrated unit 202 is controlled by retaining it on a first telescoping arm 230 that extends between and is attached to the integrated unit 202 and the buoy 226. For measurements of surface waves, the first telescoping arm 230 can be extended or retracted as needed to ensure that the depth of the integrated unit allows for the reflected waves 222 to intercept the detector 206. It is under control of an actuator 232. As noted above, the area of the detector 206 can be increased as needed as well or alternatively. Without being bound to theory, this may be useful for times of high waves. A second telescoping arm 234 is attached to the integrated unit 202 and extends downward. The second telescoping arm 234 is also under control of an actuator 236. It includes at least two thermal sensors 238 and preferably three. The thermal sensor, which may be a thermocouple 238 is in electronic communication with the computer 214 and reports on temperature. This allows the depth of the thermal interface (shown in FIG. 3) to be determined by extending or retracting the second telescoping arm 234. Adjustments to the depth of the integrated unit 202 may be made by extending or retracting the first telescoping arm 230 and/or the size of the detector 206 may be changed to ensure that the reflected waves 222 are detected by the detector 206. A radio transmitter 240 is attached to pipe 242 which extends upward from the buoy 226 and through the buoy to the first telescoping arm 230. Also located at the end of the pipe 242, and potentially on the radio transmitter 240 are solar panels 244. As shown in FIG. 2B, wires 246 extend between the solar panels 244 and the computer 214 to power the computer 214. The wires are preferably housed within the first telescoping arm 230. Alternatively, as shown in FIG. 2C, the wires 246 may be housed within an accordion piping 248 which connects with the pipe 242.

The method of determining the characteristics of the disturbance using the SDSA imager 200 are as follows. Once a sonar wave 220 is emitted from the sonar wave emitter 204, the emission time and phase of the sonar wave 220 are measured by the vector network analyzer 212 (using a Barker's code or a sonar signature that is unique to the emitted wave in intensity and phase) and the emitted time and phase are recorded by the computer 214. The sonar wave 220 then reflects as a reflected wave 222 to the reflected wave detector 206. Upon arrival of the reflected wave 222 at each pressure transducer 210, the time and phase of the reflected wave 222 at each pressure transducer 210 is measured by the vector network analyzer 212, recorded by the computer 214 and processed by the sonar software program 218 to determine the time taken for the sonar wave 220 and reflected wave 222 to travel from the sonar wave emitter 204 to the reflected wave detector 206, as well as, to determine the change in phase of the reflected wave 222 arriving at each pressure transducer 210. This is the software method. Alternatively, or additionally, the phase of the sonar wave 220 and the phase of the reflected wave 222 at the reflected wave detector 222 are determined using the quadrature processor 215 which is in communication with the sonar wave emitter 204 and each pressure transducer 210. Knowing the distance traveled from the design of the SDSA Imager and the time taken is used to determine the speed of sound at each pressure transducer 210, thus enabling a Speed of Sound (SOS) image to be produced from the data. Also, the phase difference at each pressure transducer 210 produces a phase image, which corresponds to the SOS image determined by time.

The differences in SOS and phase in their images is due to waves existing at the interface between the aquatic body and atmosphere or between the thermocline and the water above or below the thermocline (or metalimnocline). The size of the SOS difference and size of the phase shifts within their respective images is used to determine the power of the disturbance creating the waves at the interface between the aquatic body and atmosphere or between the thermocline and the water above or below the thermocline (or metalimnocline). The frequencies of these waves determine the energy of the disturbance. The direction that the interface waves move determines the wave's wave vector.

The quadrature processor 215 measures the phase of the emitted sonar wave 220 and the phase of the received wave at the detector wave 222. The difference in phase is a measure of the phase shift. Again, the phase shift measured by all the pressure transducer 210 can be used by the computer 214 to make a phase image of the waves on the surface of the aquatic interface. The phase shift information is sent to the computer 214, which is in electronic communication with the vector network analyzer 212. The computer 214 records and analyzes the data to produce a phase image made from all the measurements of all the pressure transducers 210. The phase image contains information of the surface waves of the aquatic interface.

Figure 3:
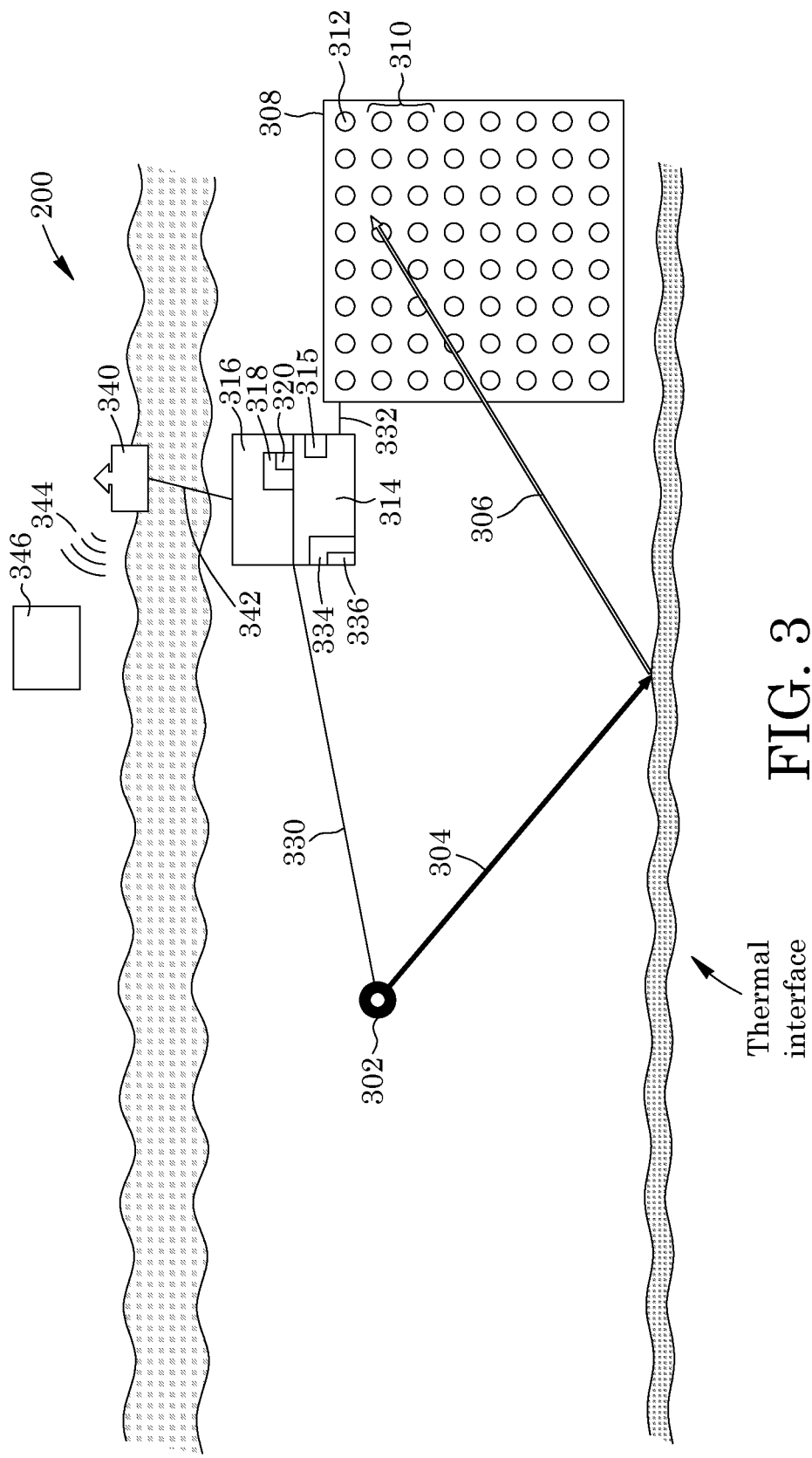
FIG. 3 is a schematic of an alternative embodiment of FIG. 1.

In another embodiment, shown in FIG. 3, the SDSA imager 200 has a sonar wave emitter 302 that emits sonar waves 304 which strike the thermal interface. The waves are reflected back from the thermal interface as reflected waves 306. The reflected waves 306 are intercepted by a reflected wave detector 308, which is a one or two-dimensional array detector 308 with a one or two-dimensional array 310 of pressure transducers 312 for creating a phase image. A vector network analyzer 314 is controlled by a computer 316. The vector network analyzer includes a quadrature processor 315. The computer 316 includes a memory 318 which includes a sonar software program 320.

The sonar software program 320 obtains data from the vector network analyzer 314 and controls its acquisition and data manipulation. The vector network analyzer 314 is preferably multiplexed with the detector 308 as every pressure transducer 312 of the detector 308 needs to have a phase and time measurement performed by the vector network analyzer 314. This can be done quickly serially but is best done by multiplexing.

The vector network analyzer 314 communicates between the sonar wave emitter 302 and the reflected wave detector 308 by a first wire 330 between the sonar wave emitter 302 and the vector network analyzer 314 of the computer 316 and a second wire 332 between the reflected wave detector 308 and the vector network analyzer 314. The vector network analyzer 314 is used to measure the amplitude, time and phase of the sonar wave 304 as well as the amplitudes, times and phases of the reflected wave 306 at each pressure transducer 312. The computer 316 or the vector network analyzer 314 include a Global Navigation Satellite System (GNSS) 334 with synchronizing clocks such as atomic clocks 336 having time resolution of ~10 exp(−11) seconds. The computer 316 communicates with a communication buoy 340 by means of a cable or wire connection 342. The communication buoy 342 communicates the data over a wireless communication link 344 to a central receiving station 346.

In one embodiment of the SDSA imager 200, the vector network analyzer 314 is used to measure the amplitude, time and phase of the sonar wave 304 as well as the amplitudes, times and phases of the reflected wave 306 at each pressure transducer 312. A signal from the sonar wave emitter 302 is sent through the first wire 330 and indicates the time that a sonar wave 304 is sent. A signal from the reflected wave detector 308 is sent through the second wire and indicates when the reflected wave 306 arrives. Therefore, this provides a time reference for determining the time taken by the sonar wave 304 to reach each pressure transducer 312 of the reflected wave detector 308.

Figure 4:
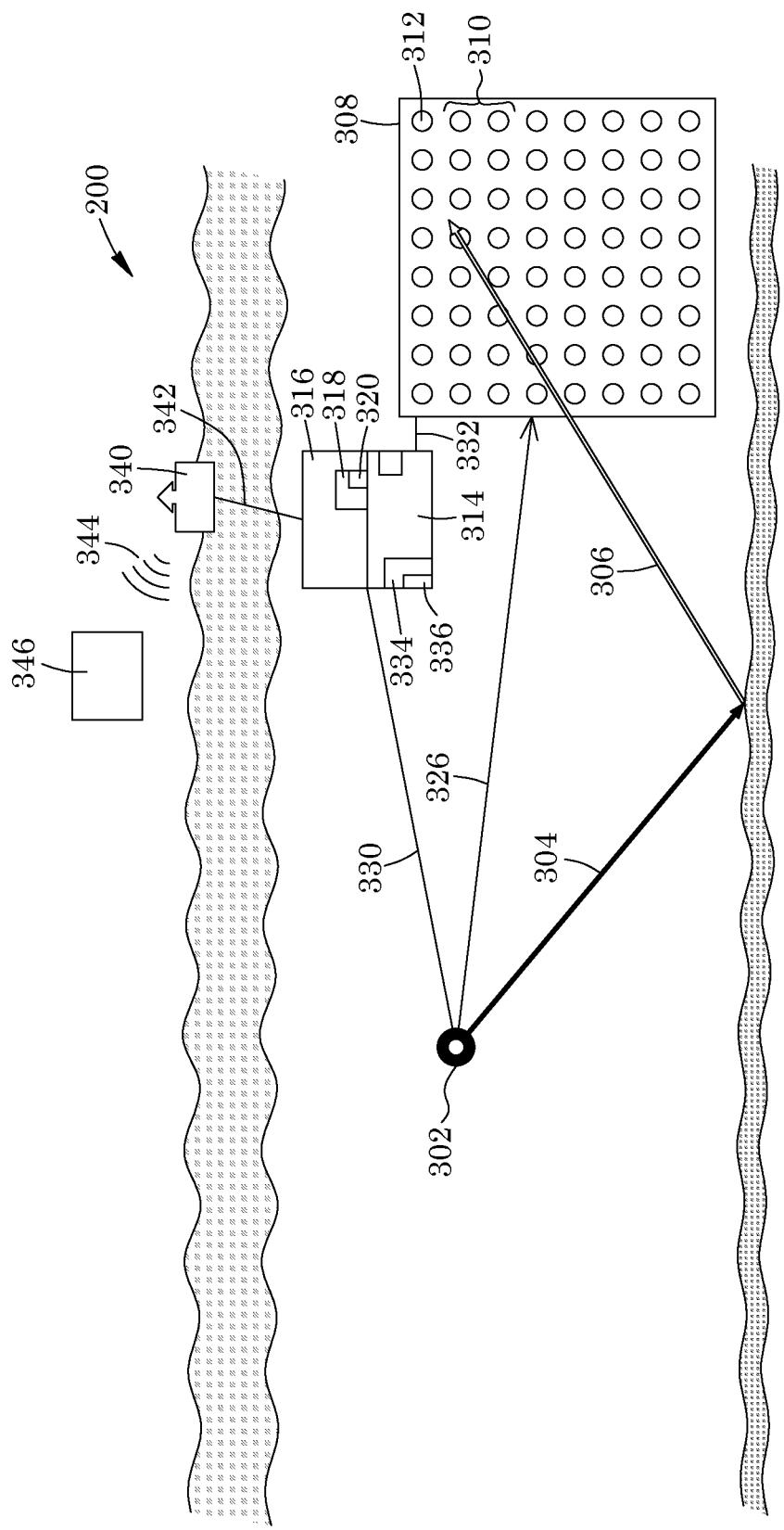
FIG. 4 is a schematic of an alternative embodiment of FIG. 1.

In another embodiment of the SDSA imager 200, shown in FIG. 4, the vector network analyzer 314 is used to measure the amplitude, time and phase of the sonar wave 304 as well as the amplitudes, times and phases of the reflected wave 306 at each pressure transducer 312. The vector network analyzer 314 communicates with the computer 316 and the computer 316 communicates with the communication buoy 340 by means of the cable or wire connection 342. The communication buoy 340 communicates the data over a wireless communication link 344 to a central receiving station 346. The vector network analyzer 314 or the computer 316 include a GNSS 334 with synchronizing clocks such as atomic clocks 336 having time resolution of ~10 exp(−11) seconds.

The sonar wave emitter 302 emits water waves 326 to the reflected wave detector 308 rather than using the first wire 330 and second wire 332 to determine the time reference. The water wave 326, which is emitted simultaneously with the sonar wave 304 traveling through the ocean/lake can be used to determine the time taken from the sonar wave emitter 302 to each pressure transducer 312 of the reflected wave detector 308. The water wave 326 travels directly to the reflected wave detector 308 whereas the sonar wave 304 travels to the thermal interface and then to the reflected wave detector 308. Knowing the distance traveled by the water wave 326 using GNSS 334 enables the water wave 326 to be used as a time reference for determining the time taken by the sonar wave 304 to reach each pressure transducer 312 of the reflected wave detector 308. The difference in time for the reflected wave 306 to reach each pressure transducer 312 of the reflected wave detector 308 is the phase shift or phase difference between each pressure transducer 312. The phase shift measured by all the pressure transducers 312 can be used by the computer 316 to make a phase image of the waves on the surface of the thermal interface.

Figure 5:
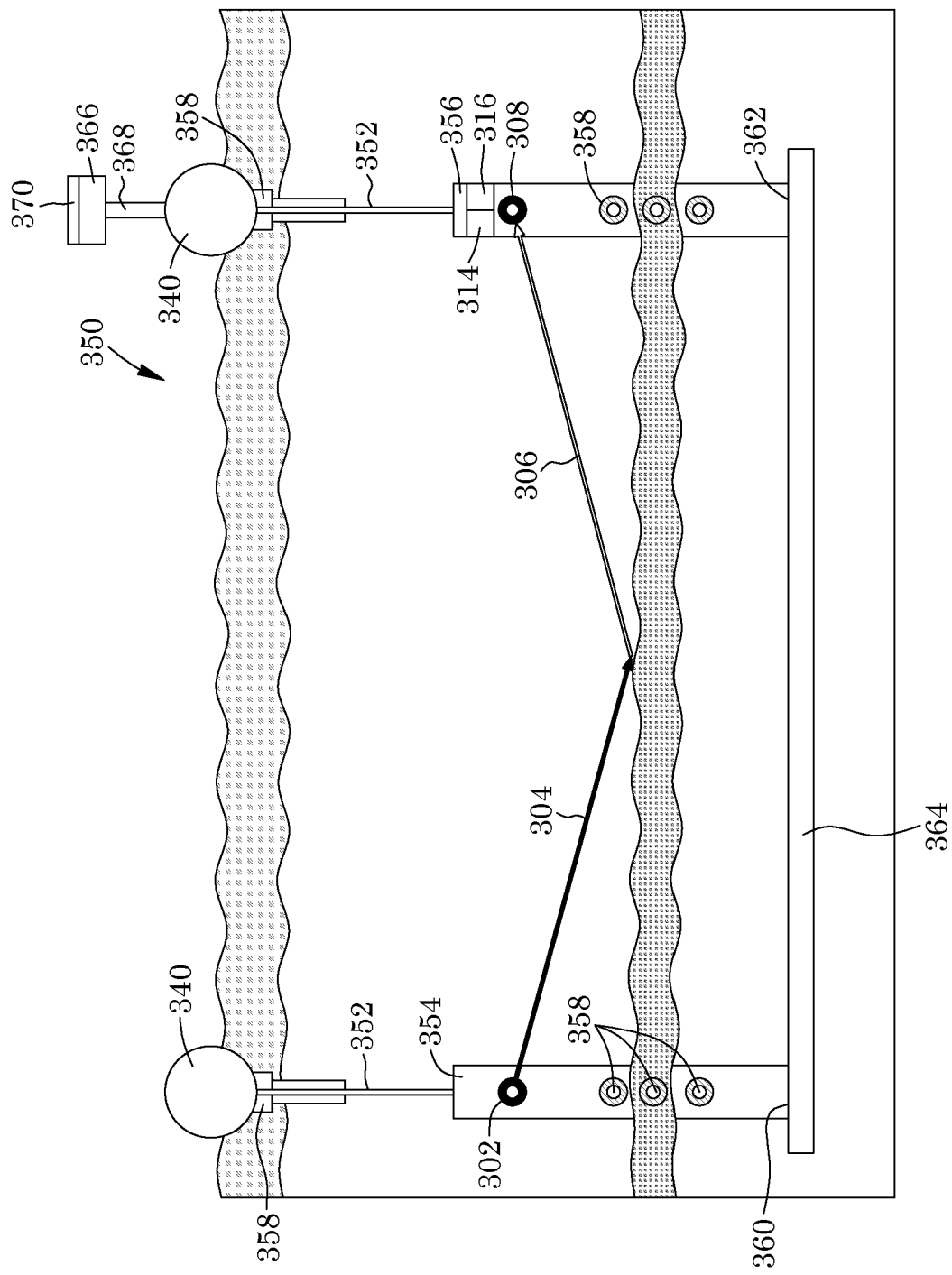
FIG. 5 is a schematic of the SDSA imager of FIGS. 3 and 4 mounted on a platform.

As shown in FIG. 5, the SDSA imager 200 is on a platform, generally referred to as 350. The pedestal has two telescoping arms 352, both which are attached to a buoy 340 at one end and to a pillar 354, 356 at the other end. The telescoping arms 352 are under control of an actuator 358, hence the pillars 354, 356 can be moved up and down in the water column. The sonar wave emitter 302 is mounted on one pillar 354 and the reflected wave detector 308 is mounted on the other pillar 356. Each pillar 354, 356 has at least one thermocouple 358 and preferably at least three, such that a top thermocouple 358 is above the thermocline, a middle thermocouple 358 is at the thermocline and a third thermocouple 358 is below the thermocline, once the telescoping arms 352 are adjusted. The distal ends 360, 362 of the pillars 354, 356 are attached to a cross member, which is a base 364, which is approximately 3 meters in length. The sonar wave emitter 302 and the reflected wave detector 308 are mounted at the same height on the pillars 354, 356, which in this embodiment, is about 0.40 meter (for a 15° angle of incidence and angle of reflectance) to about 0.45 meter (for a 17° angle of incidence and angle of reflectance) above the middle thermocouple 358. As the angle of incidence equals the angle of reflection, once the telescoping arms 352 are adjusted such that the thermocouples 358 are reporting the thermocline, the reflected waves 306 will strike the reflected wave detector 308. As for the embodiment shown in FIGS. 2A-C, one of the buoys 340 is a power and communication buoy 340. A radio transmitter 366 is mounted on a pipe 368, which is preferably flexible and is attached to the power and communication buoy 340. A solar panel 370 is also mounted on the pipe 368. Electrical cables are routed between the solar panel 370, the vector network analyzer 314, the computer 316 and each of the sonar wave emitter 302 and the reflected wave detector 308.

In alternative embodiment, the cross member 364 is longer than three meters and the height between the middle thermocouple and both the sonar wave emitter 302 and the reflected wave detector 308 are also longer, as would be known to one skilled in the art, by applying the sine law. In another alternative embodiment, the cross member 364 is shorter than three meters and the height between the middle thermocouple and both the sonar wave emitter 302 and the reflected wave detector 308 is also shorter, as would be known to one skilled in the art, by applying the sine law as follows, where h is the height between the middle thermocouple and both the sonar wave emitter 302 and the reflected wave detector 308: (sine of 15° to 17°)/h=(sine of 75° to 73°)/(length of cross member×0.5).

Figure 6:
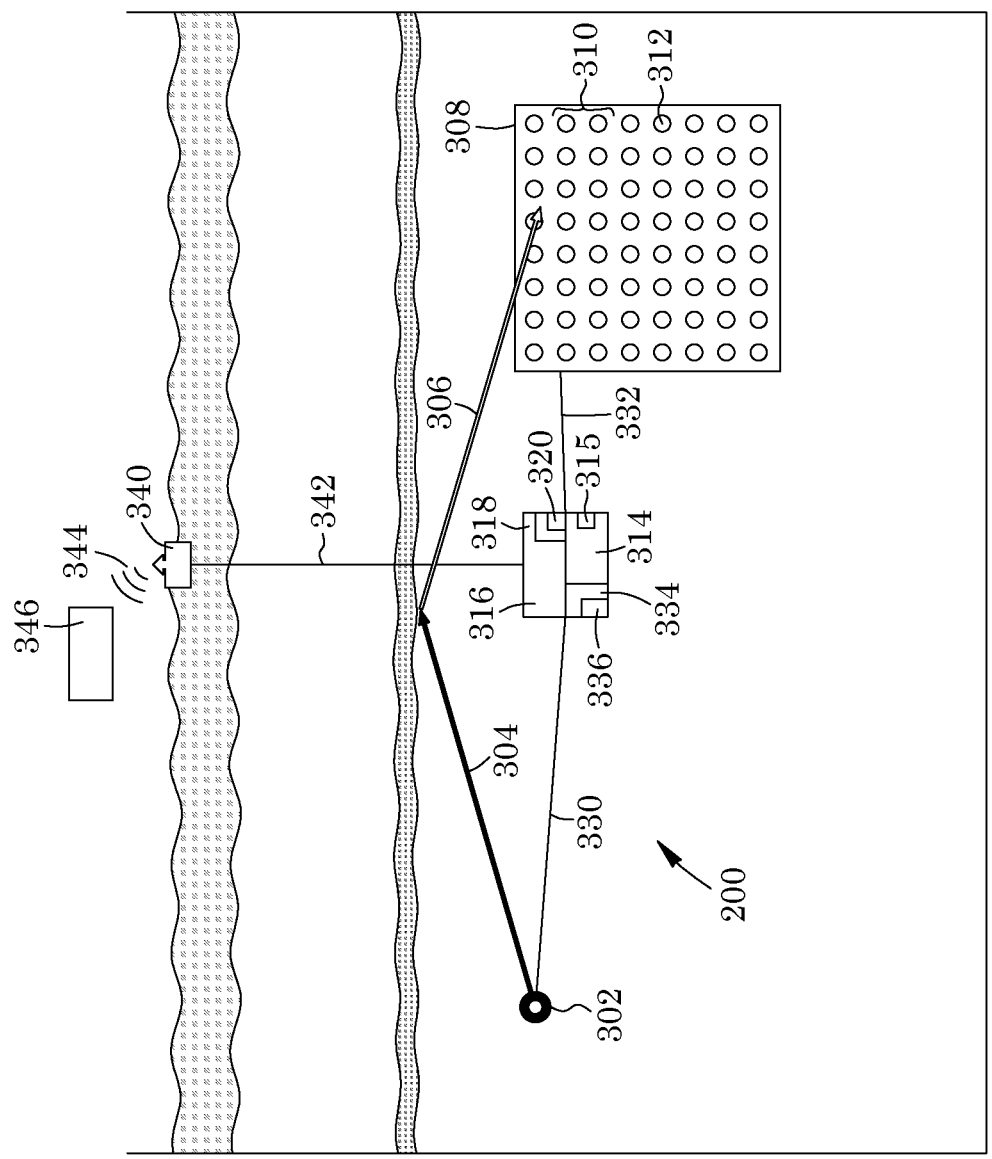
FIG. 6 is a schematic of an alternative embodiment of FIG. 1.

In another embodiment, shown in FIG. 6, the SDSA imager 200 has a sonar wave emitter 302 that emits sonar waves 304 which strike the underside of the thermal interface. It is preferable that the SDSA imager 200 is below the thermal interface as there is less interference from surface waves. The sonar waves 304 are reflected back from the thermal interface as reflected waves 306. The reflected waves 306 are intercepted by a reflected wave detector 308, which is a one or two-dimensional array detector 308 with a one or two-dimensional array 310 of pressure transducers 312 for creating a phase image. A vector network analyzer 314 is controlled by a computer 316. The vector network analyzer includes a quadrature processor 315. The computer 316 includes a memory 318 which includes a sonar software program 320.

The sonar software program 320 obtains data from the vector network analyzer 314 and controls its acquisition and data manipulation. The vector network analyzer 314 is preferably multiplexed with the detector 308 as every pressure transducer 312 of the detector 308 needs to have a time, phase and amplitude measurement performed by the vector network analyzer 314. This can be done quickly serially but is best done by multiplexing.

The vector network analyzer 314 communicates between the sonar wave emitter 302 and the reflected wave detector 308 by a first wire 330 between the sonar wave emitter 302 and the vector network analyzer 314 of the computer 316 and a second wire 332 between the reflected wave detector 308 and the vector network analyzer 314. The vector network analyzer 314 is used to measure the amplitude, time and phase of the sonar wave 304 as well as the amplitudes, time and phases of the reflected wave 306 at each pressure transducer 312. The computer 316 or the vector network analyzer 314 include a Global Navigation Satellite System (GNSS) 334 with synchronizing clocks such as atomic clocks 336 having time resolution of ~10 exp(−11) seconds. The computer 316 communicates with a communication buoy 340 by means of a cable or wire connection 342. The communication buoy 342 communicates the data over a wireless communication link 344 to a central receiving station 346.

In one embodiment of the SDSA imager 200, the vector network analyzer 314 is used to measure the amplitude, time and phase of the sonar wave 304 as well as the amplitudes, time and phases of the reflected wave 306 at each pressure transducer 312. A signal from the sonar wave emitter 302 is sent through the first wire 330 and indicates the time that a sonar wave 304 is sent. A signal from the reflected wave detector 308 is sent through the second wire and indicates when the reflected wave 306 arrives. Therefore, this provides a time reference for determining the time taken by the sonar wave 304 to reach each pressure transducer 312 of the reflected wave detector 308.

Figure 7:
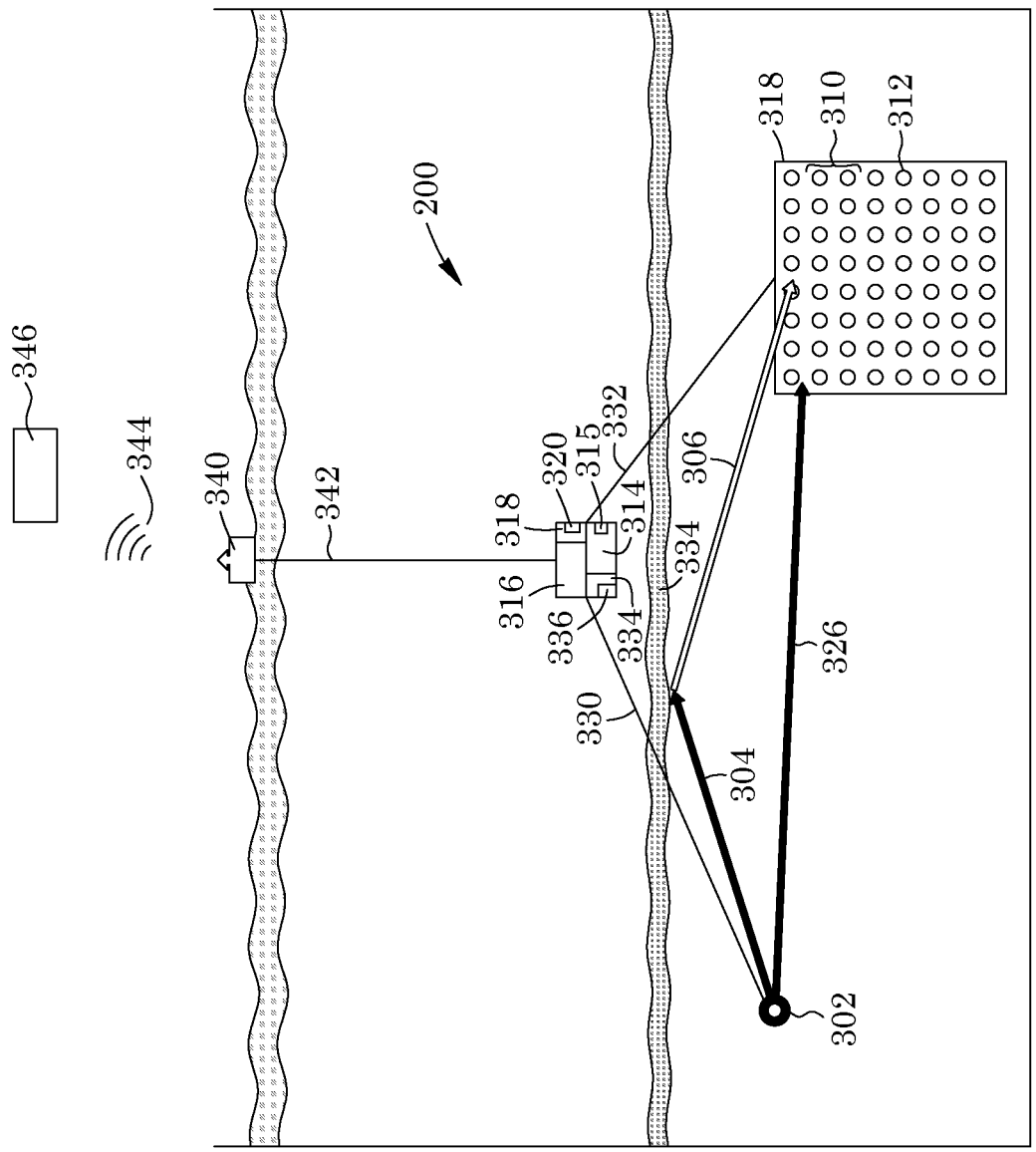
FIG. 7 is a schematic of an alternative embodiment of FIG. 1.

In another embodiment of the SDSA imager 200, shown in FIG. 7, the SDSA imager is below the thermal interface. The vector network analyzer 314 is used to measure the amplitude, time and phase of the sonar wave 304 as well as the amplitudes, time and phases of the reflected wave 306 at each pressure transducer 312. The vector network analyzer 314 communicates with the computer 316 and the computer 316 communicates with the communication buoy 340 by means of the cable or wire connection 342. The communication buoy 340 communicates the data over a wireless communication link 344 to a central receiving station 346. The vector network analyzer 314 or the computer 316 include a GNSS 334 with synchronizing clocks such as atomic clocks 336 having time resolution of ~10 exp(−11) seconds.

The sonar wave emitter 302 emits water waves 326 to the reflected wave detector 308 rather than using the first wire 330 and second wire 332 to determine the time reference.

The water wave 326, which is emitted simultaneously with the sonar wave 304 traveling through the ocean/lake can be used to determine the time taken from the sonar wave emitter 302 to each pressure transducer 312 of the reflected wave detector 308. The water wave 326 travels directly to the reflected wave detector 308 whereas the sonar wave 304 travels to the thermal interface and then to the reflected wave detector 308. Knowing the distance traveled by the water wave 326 using GNSS 334 enables the water wave 326 to be used as a time reference for determining the time taken by the sonar wave 304 to reach each pressure transducer 312 of the reflected wave detector 308. The difference in time for the reflected wave 306 to reach each pressure transducer 312 of the reflected wave detector 308 is the phase shift or phase difference between each pressure transducer 312. The phase shift measured by all the pressure transducers 312 can be used by the computer 316 to make a phase image of the waves on the surface of the thermal interface.

Figure 8:
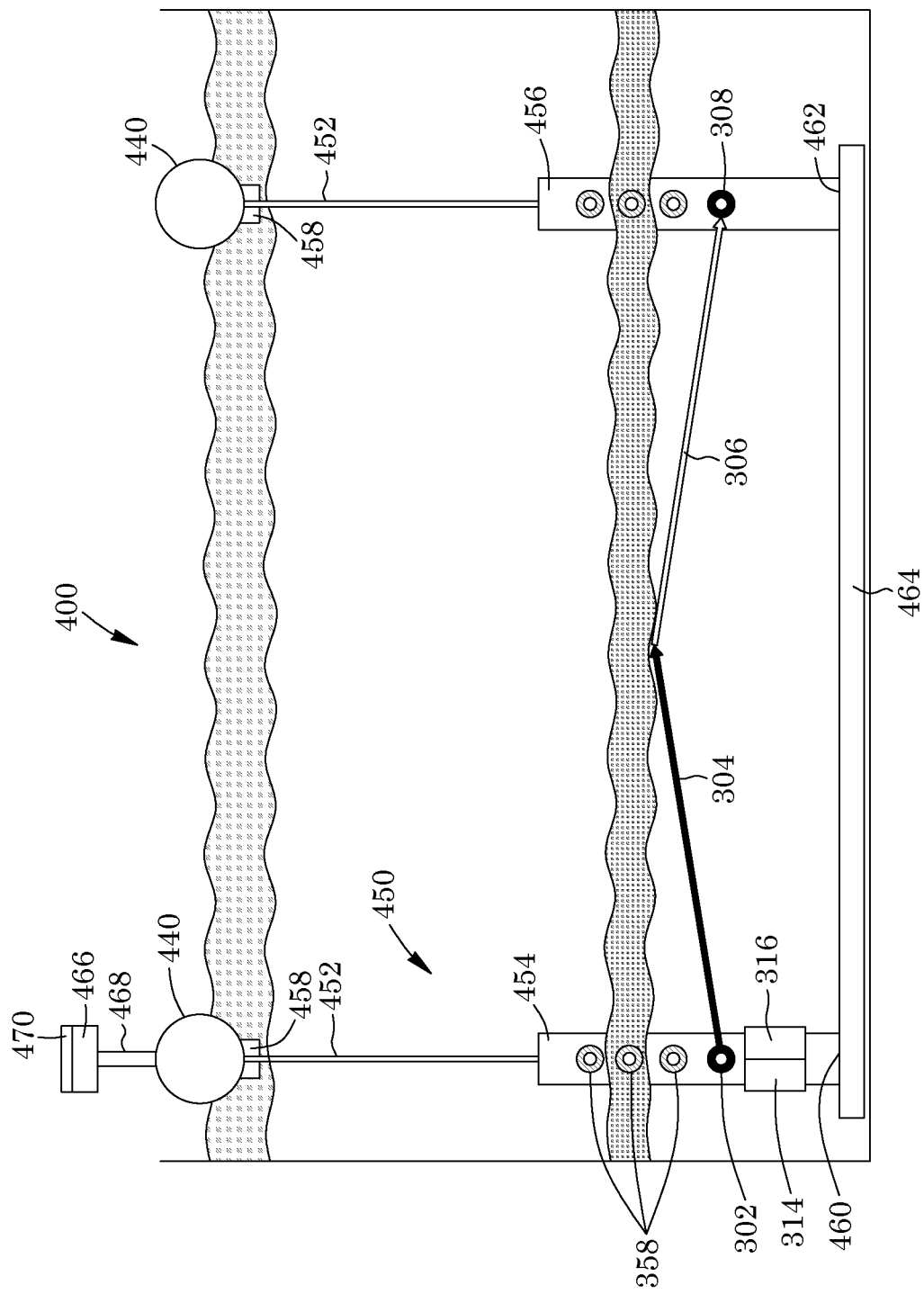
FIG. 8 is a schematic of the SDSA imager of FIGS. 6 and 7 mounted on a platform.

An installation, generally referred to as 400, is shown in FIG. 8. The SDSA imager 200 is on a platform, generally referred to as 450. The pedestal has two telescoping arms 452, both which are attached to a buoy 440 at one end and to a pillar 454, 456 at the other end. The telescoping arms 452 are under control of an actuator 458, hence the pillars 454, 456 can be moved up and down in the water column. The sonar wave emitter 302 is mounted on one pillar 454 and the reflected wave detector 308 is mounted on the other pillar 456. Each pillar 454, 456 has at least one thermocouple 358 and preferably at least three, such that a top thermocouple 358 is above the thermocline, a middle thermocouple 358 is at the thermocline and a third thermocouple 358 is below the thermocline, once the telescoping arms 452 are adjusted. The distal ends 460, 462 of the pillars 454, 456 are attached to a cross member 464 which is approximately 3 meters in length. The sonar wave emitter 302 and the reflected wave detector 308 are mounted at the same height on the pillars 454, 456, which in this embodiment, is about 0.40 (for a 15° angle of incidence and angle of reflectance) to about 0.45 meter (for a 17° angle of incidence and angle of reflectance) below the middle thermocouple 358. As the angle of incidence equals the angle of reflection, once the telescoping arms 452 are adjusted such that the thermocouples 358 are reporting the thermocline, the reflected waves 306 will strike the reflected wave detector 308. As for the embodiment shown in FIGS. 2A-C, one of the buoys 440 is a power and communication buoy 440. A radio transmitter 466 is mounted on a pipe 468, which is preferably flexible and is attached to the power and communication buoy 440. A solar panel 470 is also mounted on the pipe 468. Electrical cables are routed between the solar panel 470, the vector network analyzer 314, the computer 316 and each of the sonar wave emitter 302 and the reflected wave detector 308.

In alternative embodiment, the cross member 464 is longer than three meters and the height between the middle thermocouple and both the sonar wave emitter 302 and the reflected wave detector 308 is also longer, as would be known to one skilled in the art, by applying the sine law. In another alternative embodiment, the cross member 464 is shorter than three meters and the height between the middle thermocouple and both the sonar wave emitter 302 and the reflected wave detector 308 is also shorter, as would be known to one skilled in the art, by applying the sine law as follows, where h is the height between the middle thermocouple and both the sonar wave emitter 302 and the reflected wave detector 308: (sine of 15° to 17°)/h=(sine of 75° to 73°)/(length of cross member×0.5). This can alternatively be expressed as (sine of 15° to 17°)/h=(sine of 75° to 73°)/([distance between emitter and detector]×0.5). This can also be described by the following equation: (sine of 15° to 17°)/(h+[height between top and bottom thermocouple]×0.5=(sine of 75° to 73°)/([distance between emitter and detector]×0.5).

Figure 9A:
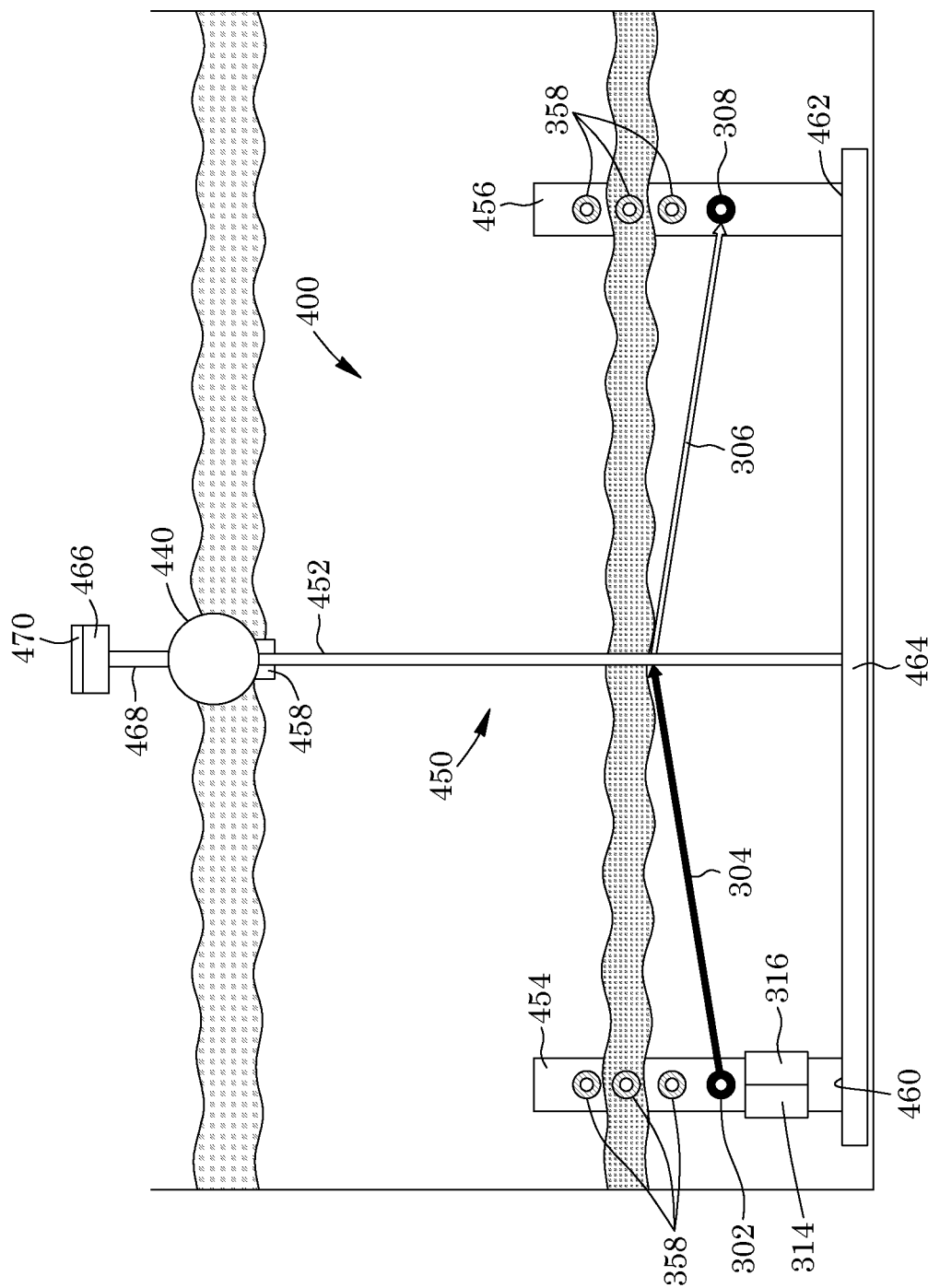
FIG. 9A is a schematic of the SDSA imager of FIGS. 6 and 7 mounted on an alternative embodiment platform.
Figure 9B:
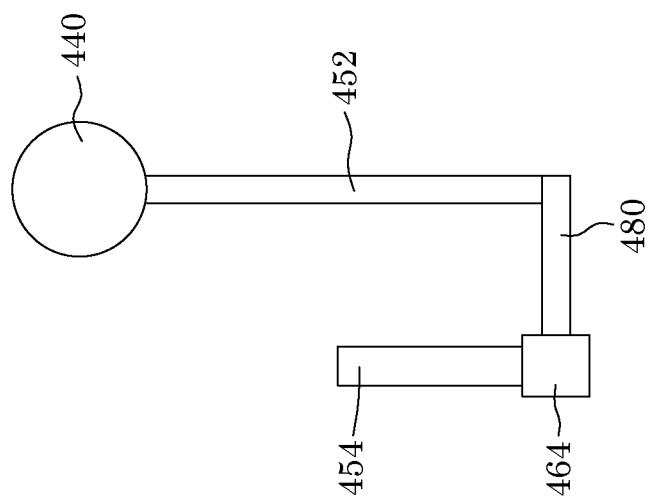
FIG. 9B is a side view of the platform.

FIG. 9A shows an alternative embodiment of the platform 450 of FIG. 8. A single telescoping arm 452 is attached to a buoy 440 at one end and indirectly to the cross member 464 at the other end. There are two short pillars 454, 456 which are attached to the cross member 464. The telescoping arm 452 is under control of an actuator 458, hence the pillars 454, 456 can be moved up and down in the water column. The sonar wave emitter 302 is mounted on one pillar 454 and the reflected wave detector 308 is mounted on the other pillar 456. Each pillar 454, 456 has at least one thermocouple 358 and preferably at least three, such that a top thermocouple 358 is above the thermocline, a middle thermocouple 358 is at the thermocline and a third thermocouple 358 is below the thermocline, once the telescoping arm 452 is adjusted. As shown in FIG. 9B, the distal ends 460, 462 of the pillars 454, 456 are attached to the cross member 464 which is approximately 3 meters in length. The sonar wave emitter 302 and the reflected wave detector 308 are mounted at the same height on the pillars 454, 456, which in this embodiment, is about 0.40 to about 0.45 meter below the middle thermocouple 358.

The sonar wave emitter 302 and the reflected wave detector 308 are mounted at the same height on the pillars 454, 456, which in this embodiment, is about 0.40 (for a 15° angle of incidence and angle of reflectance) to about 0.45 meter (for a 17° angle of incidence and angle of reflectance) below the middle thermocouple. As the angle of incidence equals the angle of reflection, once the telescoping arms 452 are adjusted such that the thermocouples 358 are reporting the thermocline, the reflected waves 306 will strike the reflected wave detector 308. The buoy 440 is a power and communication buoy 440. A radio transmitter 466 is mounted on a pipe 468, which is preferably flexible and is attached to the power and communication buoy 440. A solar panel 470 is also mounted on the pipe 468. Electrical cables are routed between the solar panel 470, the vector network analyzer 314, the computer 316 and each of the sonar wave emitter 302 and the reflected wave detector 308. As shown in FIG. 9B, there is a short leg 480 that extends between the cross member 464 and the telescoping arm 452. This holds the telescoping arm 452 on a different plane to the pillars 454, 456, thus ensuring that the sonar wave isn't physically blocked from the thermocline.

Figure 10A:
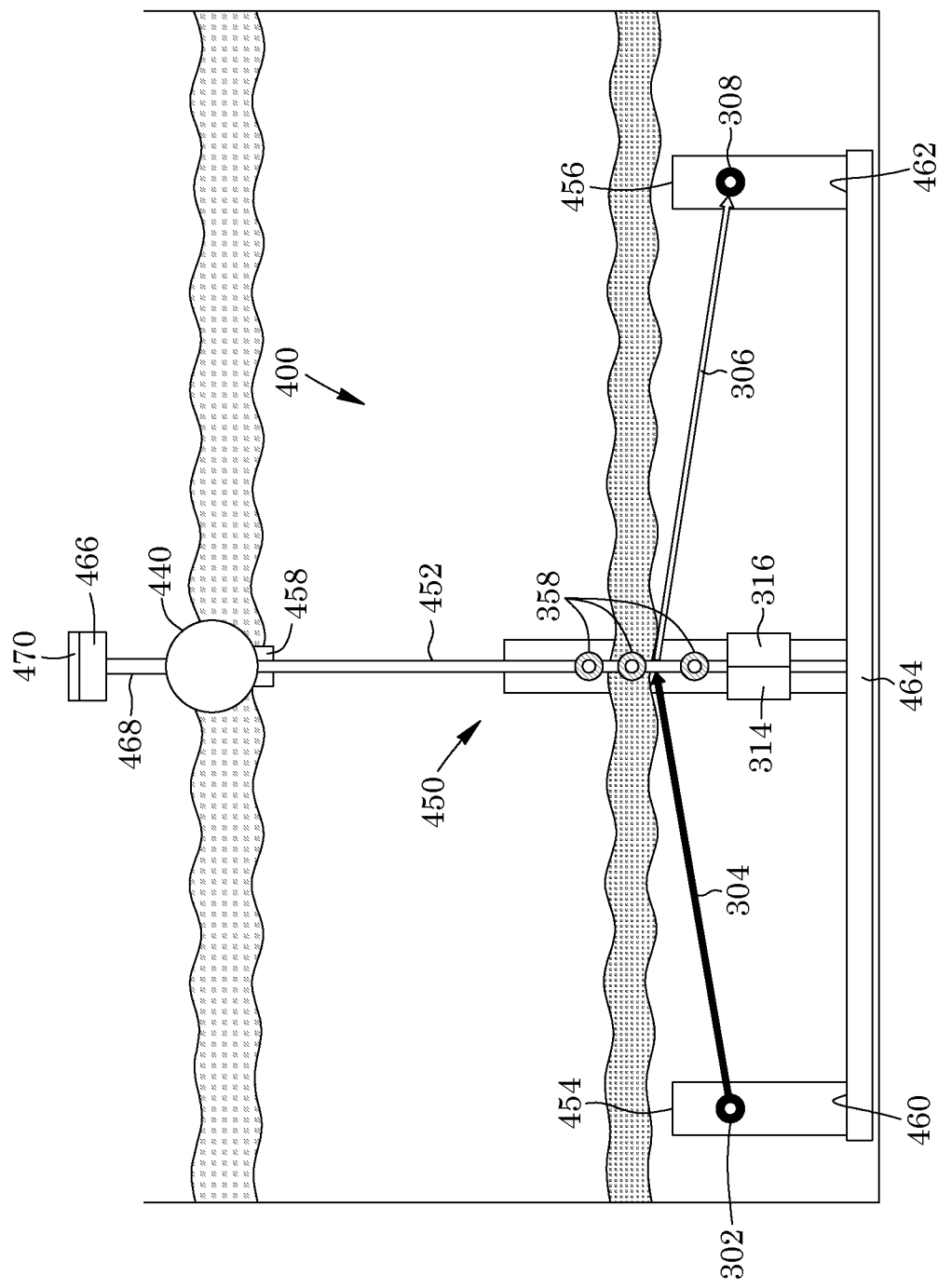
FIG. 10A is a schematic of the SDSA imager of FIGS. 6 and 7 mounted on an alternative embodiment platform.
Figure 10B:
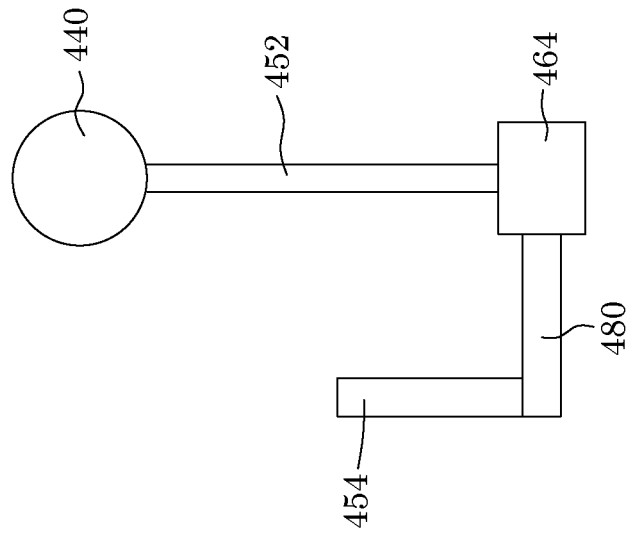
FIG. 10B is a side view of the platform.

FIG. 10A shows an alternative embodiment of the platform 450 of FIG. 8. A single telescoping arm 452 is attached to a buoy 440 at one end and to the cross member 464 at the other end. There are two short pillars 454, 456 which are indirectly attached to the cross member 464 (as shown in FIG. 10B). The telescoping arm 452 is under control of an actuator 458, hence the pillars 454, 456 can be moved up and down in the water column. The sonar wave emitter 302 is mounted on one pillar 454 and the reflected wave detector 308 is mounted on the other pillar 456. The telescoping arm 452 has at least two thermocouples 358 and preferably at least three, such that a top thermocouple 358 is above the thermocline, a middle thermocouple 358 is at the thermocline and a third thermocouple 358 is below the thermocline, once the telescoping arm 452 is adjusted. The distal ends 460, 462 of the pillars 454, 456 are attached to the cross member 464 which is approximately 3 meters in length. The sonar wave emitter 302 and the reflected wave detector 308 are mounted at the same height on the pillars 454, 456, which in this embodiment, is about 0.40 to about 0.45 meter below the middle thermocouple 358. As the angle of incidence equals the angle of reflection, once the telescoping arms 452 are adjusted such that the thermocouples 358 are reporting the thermocline, the reflected waves 306 will strike the reflected wave detector 308. The buoy 440 is a power and communication buoy 440. A radio transmitter 466 is mounted on a pipe 468, which is preferably flexible and is attached to the power and communication buoy 440. A solar panel 470 is also mounted on the pipe 468. Electrical cables are routed between the solar panel 470, the vector network analyzer 314, the computer 316 and each of the sonar wave emitter 302 and the reflected wave detector 308. As shown in FIG. 9B, there is a short leg 480 that extends between the cross member 464 and the pillars 454, 456. This holds the telescoping arm 452 on a different plane to the pillars 454, 456, thus ensuring that the sonar wave isn't physically blocked from the thermocline.

Figure 11:
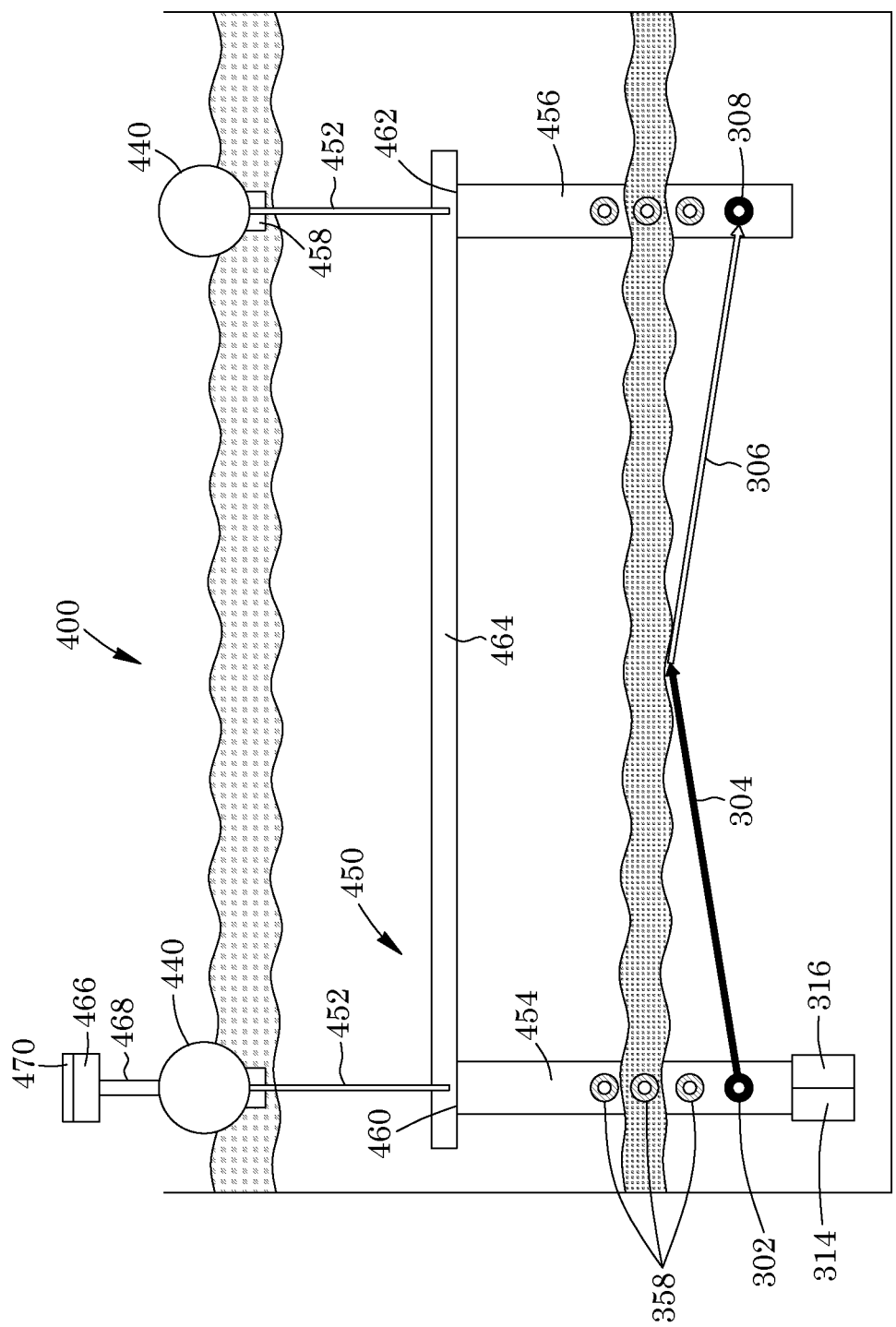
FIG. 11 is a schematic of the SDSA imager of FIGS. 6 and 7 mounted on an alternative embodiment platform.

An alternative embodiment installation, generally referred to as 400, is shown in FIG. 11. The SDSA imager 200 is on a platform, generally referred to as 450. The pedestal has two telescoping arms 452, both which are attached to a buoy 440 at one end and to a cross member which is a header 464 at the other end. The telescoping arms 452 are under control of an actuator 458, hence the pillars 454, 456 can be moved up and down in the water column. The sonar wave emitter 302 is mounted on one pillar 454 and the reflected wave detector 308 is mounted on the other pillar 456. Each pillar 454, 456 has at least one thermocouple 358 and preferably at least three, such that a top thermocouple 358 is above the thermocline, a middle thermocouple 358 is at the thermocline and a third thermocouple 358 is below the thermocline, once the telescoping arms 452 are adjusted. The distal ends 460, 462 of the pillars 454, 456 are attached to the cross member 464 which is approximately 3 meters in length. The telescoping arms 452 extend upwards from the header and the pillars 454, 456 extend downward from the header.

Figure 12:
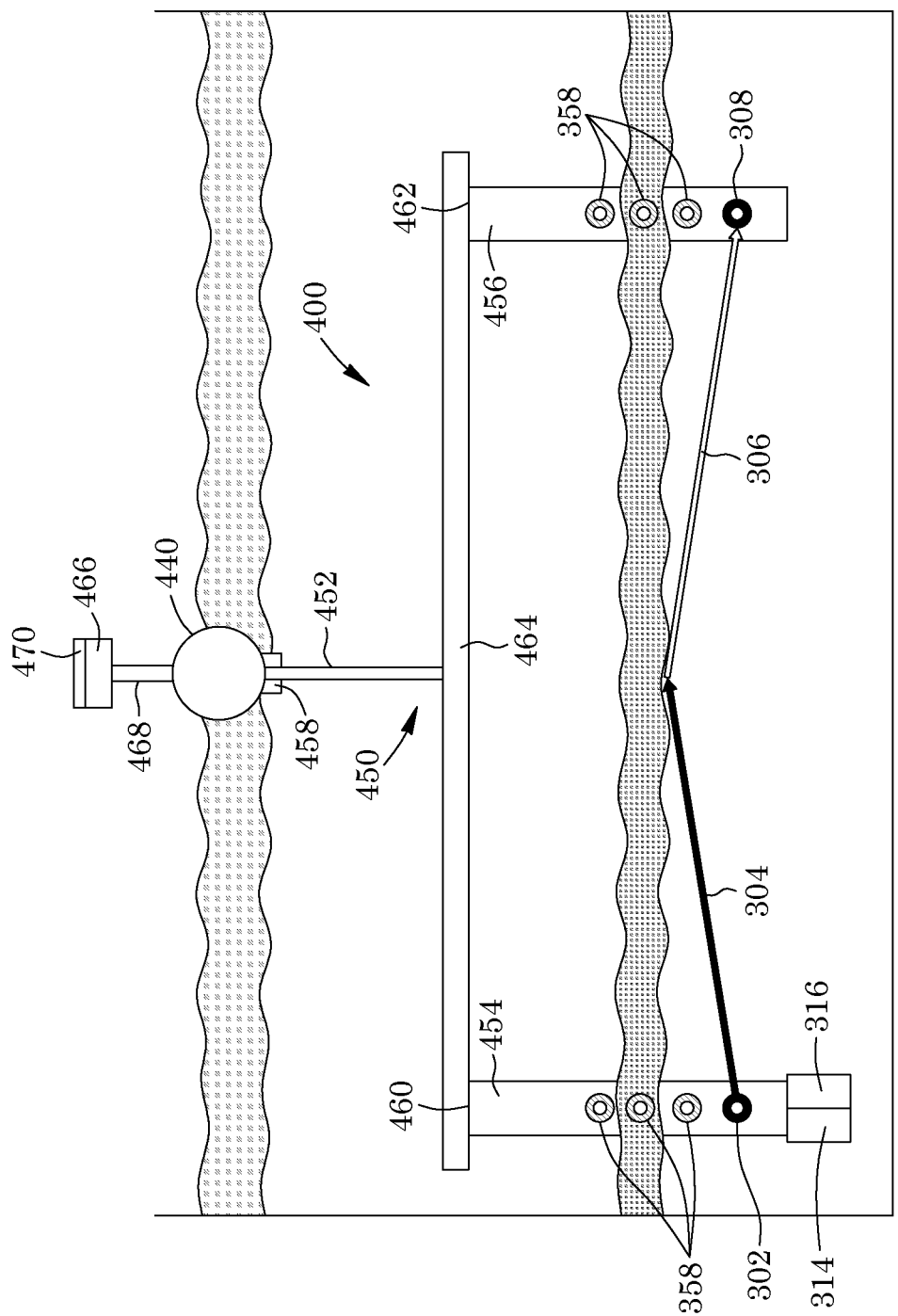
FIG. 12 is a schematic of the SDSA imager of FIGS. 6 and 7 mounted on an alternative embodiment platform.

Another alternative embodiment installation, generally referred to as 400, is shown in FIG. 12. The SDSA imager 200 is on a platform, generally referred to as 450. The pedestal has one telescoping arm 452, which is attached to a buoy 440 at one end and to the cross member 464, which is a header 464 at the other end. The telescoping arm 452 is under control of an actuator 458, hence the pillars 454, 456 can be moved up and down in the water column. The sonar wave emitter 302 is mounted on one pillar 454 and the reflected wave detector 308 is mounted on the other pillar 456. Each pillar 454, 456 has at least one thermocouple 358 and preferably at least three, such that a top thermocouple 358 is above the thermocline, a middle thermocouple 358 is at the thermocline and a third thermocouple 358 is below the thermocline, once the telescoping arms 452 are adjusted. The distal ends 460, 462 of the pillars 454, 456 are attached to the header 464 which is approximately 3 meters in length. The telescoping arm 452 extends upwards from the header and the pillars 454, 456 extend downward from the header.

Figure 13A:
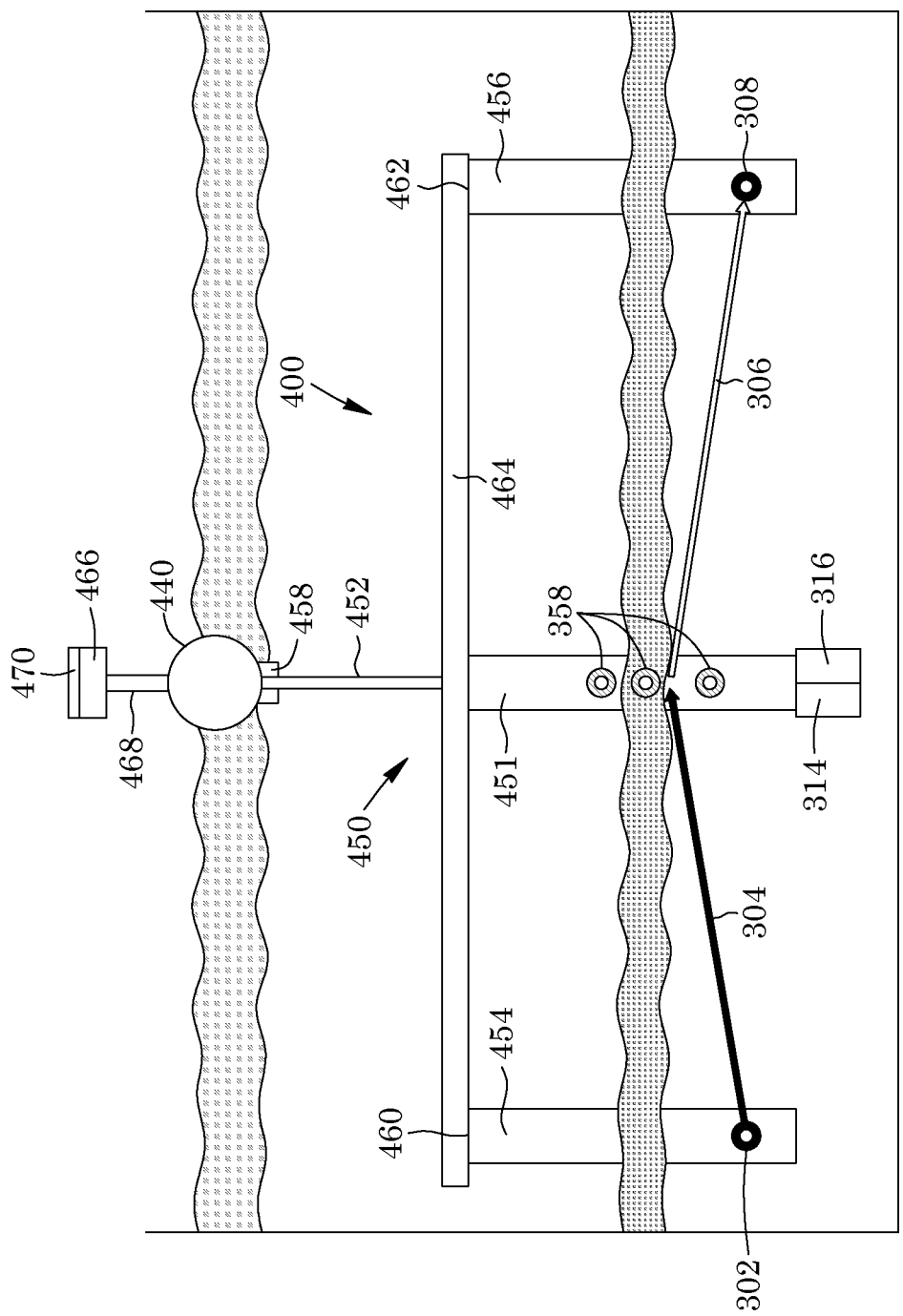
FIG. 13A is a schematic of the SDSA imager of FIGS. 6 and 7 mounted on an alternative embodiment platform.
Figure 13B:
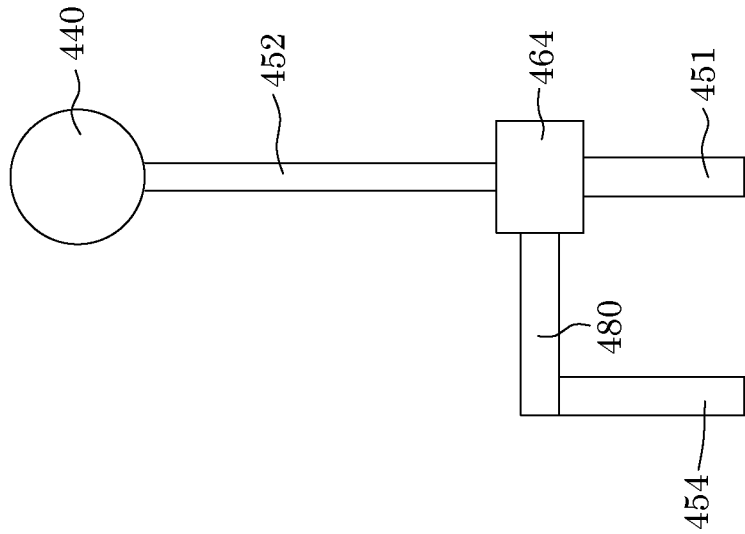
FIG. 13B is a side view of the platform.

FIG. 13A shows another alternative embodiment of the platform 450. A single telescoping arm 452 is attached to a buoy 440 at one end and to the cross member 464, which is a header at the other end. There are two short pillars 454, 456 which are indirectly attached to the cross member 464. The telescoping arm 452 is under control of an actuator 458, hence the pillars 454, 456 can be moved up and down in the water column. The sonar wave emitter 302 is mounted on one pillar 454 and the reflected wave detector 308 is mounted on the other pillar 456. A vertically disposed member 451 is attached to the header 464 and extends orthogonally downward (the same direction that the pillars 454, 456 extend). The vertically disposed member 451 has at least two thermocouples 358 and preferably at least three, such that a top thermocouple 358 is above the thermocline, a middle thermocouple 358 is at the thermocline and a third thermocouple 358 is below the thermocline, once the telescoping arm 452 is adjusted. The distal ends 460, 462 of the pillars 454, 456 are indirectly attached to the header 464 which is approximately 3 meters in length. The sonar wave emitter 302 and the reflected wave detector 308 are mounted at the same height on the pillars 454, 456, which in this embodiment, is about 0.40 to about 0.45 meter below the middle thermocouple 358. As the angle of incidence equals the angle of reflection, once the telescoping arms 452 are adjusted such that the thermocouples 358 are reporting the thermocline, the reflected waves 306 will strike the reflected wave detector 308. The buoy 440 is a power and communication buoy 440. A radio transmitter 466 is mounted on a pipe 468, which is preferably flexible and is attached to the power and communication buoy 440. A solar panel 470 is also mounted on the pipe 468. Electrical cables are routed between the solar panel 470, the vector network analyzer 314, the computer 316 and each of the sonar wave emitter 302 and the reflected wave detector 308. As shown in FIG. 13B, there is a short leg 480 that extends between the cross member 464 and the pillars 454, 456. This holds the telescoping arm 452 on a different plane to the pillars 454, 456, thus ensuring that the sonar wave isn't physically blocked from the thermocline.

Using two or more SDSA imagers 200, as shown in FIG. 14, one can, based on the difference in speed of sound between the them, determine the power (the size of change in speed of sound between the SDSA imagers 200), energy (the frequency of the waves on the thermocline interface) and location of ocean disturbance 500 (the wave vector of the thermocline or surface wave) using triangulation between two separated SDSA imagers 200.

The vector network analyzer 314 measures the amplitude, time and phase of the sonar wave 304 as well as the amplitudes, times and phases of the reflected wave 306. The differences in phase of the reflected wave 306 and the sonar wave 304 i.e., the phase shift or phase difference is used to make a phase image 502. The phase image 502 is then mathematically analyzed using a Fourier Transform 504 (and by many other mathematical methods known in science and engineering) to obtain properties of the waves coming from the aquatic body disturbing event in the aquatic interface. From the square of the amplitude of the waves in the phase image, the power of the waves at the aquatic interface can be determined. From the frequencies of the waves in the phase image, the energy of the aquatic body disturbing event can be determined. From the wave vectors of the waves in the phase image the location of the aquatic body disturbing event can be determined.

Figure 15:
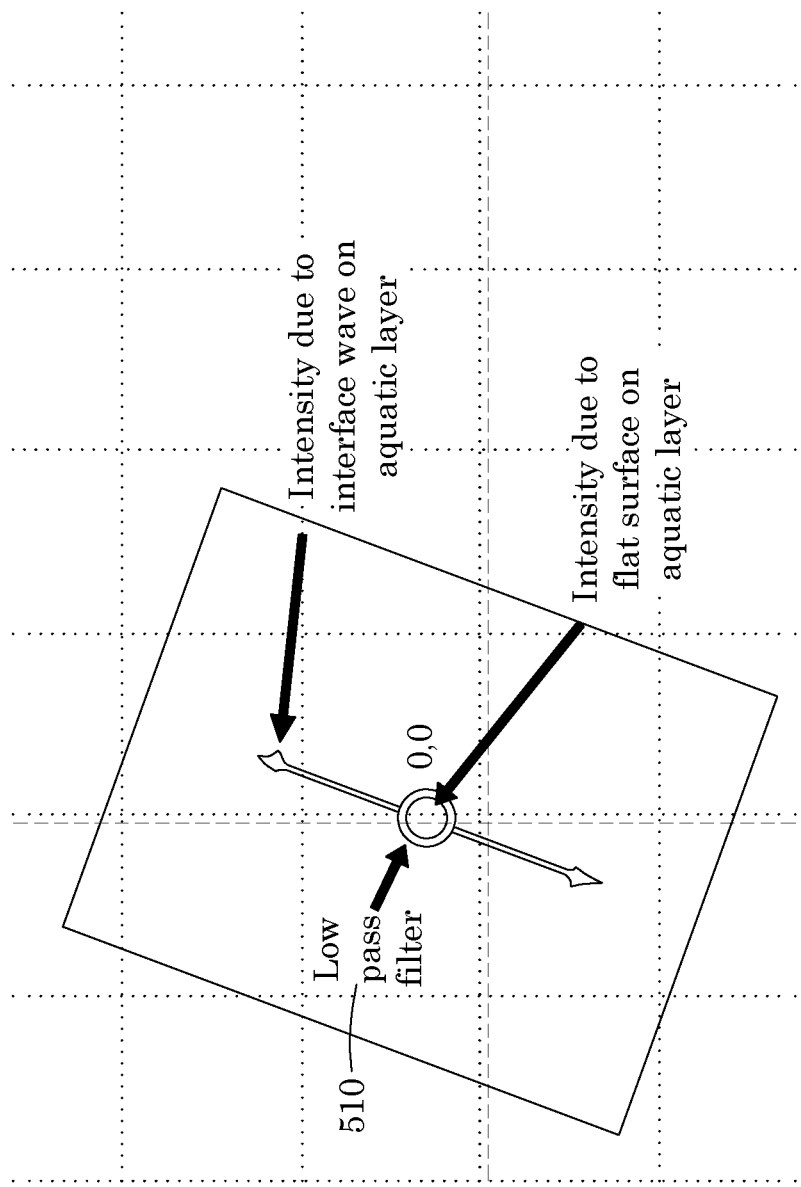
FIG. 15 shows the use of a low pass filter applied to the Fourier image for acquiring the zero phase shift information used to determine the refractive index for an aquatic body.

As shown in FIG. 15, a low pass filter 510 which is an aperture that allows only the phase information around the 0,0 frequency point within the Fourier image to be used for analysis purposes. Mathematically, all intensities are removed except the amplitude information around the 0,0 point in the phase image using a low pass filter or one of the many other types of image filters. Removal of the aquatic interface's surface wave information by the low pass filter leaves only the information that hasn't been phase shifted by the waves on the aquatic interface. The low pass filtered information (zero phase shift information) can then be used to monitor the changes in the water's refractive indices that depend on the water's temperature, pressure and composition.

Figure 16:
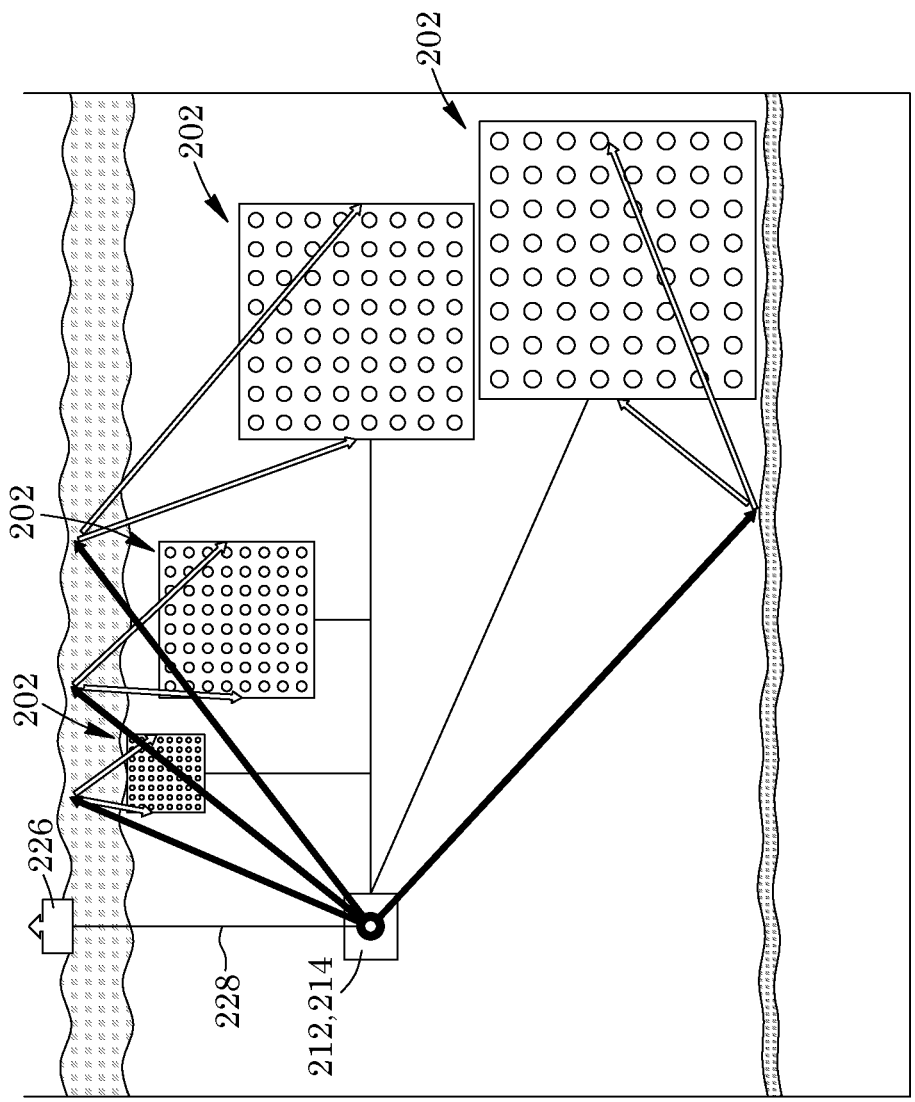
FIG. 16 is a schematic of a system of SDSA imagers.

As shown in FIG. 16 a number of reflected wave detectors 206 each have spacing between the pressure transducers 210 that differs from the other reflected wave detectors 206.

These can be used to measure a larger range of frequencies of the aquatic interface waves than by just using one detector. The reflected wave detectors 206 with small spacing between the pressure transducers 210 will detect higher frequency waves than those with larger spacing between the pressure transducers 210.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A sonar aquatic (SA) imaging installation for detecting disturbances in a thermal interface of an aquatic body, the SA imaging installation comprising: a platform which includes a cross member, at least one telescoping arm extending orthogonally from the cross member and attached directly or indirectly to the cross member at a telescoping arm proximal end, a buoy attached to a distal end of the telescoping arm, a first pillar and a second pillar, the pillars spaced apart a distance, attached directly or indirectly to the cross member and extending orthogonally from the cross member; a sonar wave emitter which is mounted on the first pillar and is configured to emit a sonar wave signal; a reflected wave detector, which is mounted on the second pillar and includes either a one dimensional array of pressure transducers or a two dimensional array of pressure transducers, the reflected wave detector configured to receive a reflected wave signal; a vector network analyzer, the vector network analyzer including a Global Navigation Satellite System (GNSS) and an at least one timer, the vector network analyzer in electrical communication with the sonar wave emitter via a first wire and the reflected wave detector via a second wire; and a computer which includes a sonar software programme, which is in electronic communication with the vector network analyzer.

2. The installation of claim 1, wherein the buoy is a communication buoy which is in electrical communication with the computer.

3. The installation of claim 1, further comprising at least a first and a second thermal sensor mounted on the platform and in electronic communication with the computer, the first thermal sensor vertically disposed from the sonar wave emitter a first height and the second thermal sensor vertically disposed from the first thermal sensor a second height.

4. The installation of claim 3, wherein the first thermal sensor is vertically disposed from the reflected wave detector the first height.

5. The installation of claim 4, wherein the distance between the sonar wave emitter and the reflected wave detector is defined by (sine of 15° to 17°)/(first height+0.5 second height=(sine of 75° to 73°)/(0.5 distance).

6. The installation of claim 5, wherein the distance between the sonar wave emitter and the reflected wave detector is about 3 meters.

7. The installation of claim 6, wherein the sonar wave emitter and the reflected wave detector are disposed below the thermal sensors.

8. The installation of claim 4, wherein the computing device includes a memory and a processor, the memory including instructions for calculating a phase shift.

9. The installation of claim 8, wherein the memory further includes instructions for calculating a refractive index based on the phase shift.

10. The installation of claim 9, wherein the sonar wave emitter is configured to emit a water wave and the reflected wave detector is configured to detect the water wave.

11. The installation of claim 10, wherein the vector network analyzer includes a quadrature processor.

12. A method of detecting a thermal interface disturbing event in a thermal interface of a body of water, the method comprising utilizing at least one SA imaging installation, the SA imaging installation comprising: a platform which includes a cross member, at least one telescoping arm extending orthogonally from the cross member and attached directly or indirectly to the cross member at a telescoping arm proximal end, a buoy attached to a distal end of the telescoping arm, a first pillar and a second pillar, the pillars spaced apart a distance, attached directly or indirectly to the cross member and extending orthogonally from the cross member; a sonar wave emitter which is mounted on the first pillar and is configured to emit a sonar wave signal; a reflected wave detector, which is mounted on the second pillar and includes either a one dimensional array of pressure transducers or a two dimensional array of pressure transducers, the reflected wave detector configured to receive a reflected wave signal; at least a first and a second thermal sensor mounted on the platform, the first thermal sensor vertically disposed from the sonar wave emitter a first height and the second thermal sensor vertically disposed from the first thermal sensor a second height; a vector network analyzer, the vector network analyzer including a Global Navigation Satellite System (GNSS) and an at least one timer, the vector network analyzer in electrical communication with the sonar wave emitter via a first wire and the reflected wave detector via a second wire; and a computer which includes a sonar software programme, which is in electronic communication with the first and second thermal sensors and the vector network analyzer, the method comprising locating the platform such that the first thermal sensor is above the thermal interface and the second thermal sensor is below the thermal interface, emitting a sonar wave from the sonar wave emitter to the thermal interface, detecting a reflected wave reflected from the thermal interface with the one or two dimensional array of pressure sensors housed in the reflected wave detector, and determining a phase shift between the emitted sonar wave and the reflected wave with the vector network analyzer.

13. The method of claim 12, wherein the sonar wave is emitted from the sonar emitter to an underside of the thermal interface.

14. The method of claim 13, further comprising the sonar wave emitter emitting a water wave concomitantly with the emitting of the sonar wave.

* * * * *